US012786598B2

(12) United States Patent
Chang et al.

(10) Patent No.: US 12,786,598 B2
(45) Date of Patent: Nov. 3, 2026

(54) OPTICAL CROSS-CONNECT APPARATUS AND OPTICAL CROSS-CONNECT DEVICE

(71) Applicant: Huawei Technologies Co., Ltd., Shenzhen (CN)

(72) Inventors: Zeshan Chang, Shenzhen (CN); Ning Deng, Shenzhen (CN); Jun Luo, Dongguan (CN); Jiang Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 206 days.

(21) Appl. No.: 18/674,116

(22) Filed: May 24, 2024

(65) Prior Publication Data

US 2024/0314473 A1 Sep. 19, 2024

Related U.S. Application Data

(63) Continuation of application No. PCT/CN2022/132082, filed on Nov. 15, 2022.

(30) Foreign Application Priority Data

Nov. 27, 2021 (CN) ......................... 202111426380.1

(51) Int. Cl.
*H04J 14/00* (2006.01)
*G02B 6/35* (2006.01)
*H04Q 11/00* (2006.01)

(52) U.S. Cl.
CPC ....... *H04Q 11/0005* (2013.01); *G02B 6/3512* (2013.01); *G02B 6/3546* (2013.01); *H04Q 2011/0016* (2013.01)

(58) Field of Classification Search
CPC ........... H04Q 11/0005; H04Q 11/0003; H04Q 11/0066; H04Q 11/0067; H04Q 11/0062;
(Continued)

(56) References Cited

U.S. PATENT DOCUMENTS 6,333,799 B1 * 12/2001 Bala .................. H04Q 11/0005 398/9
6,731,832 B2 5/2004 Alvarez et al.
(Continued)

FOREIGN PATENT DOCUMENTS

CN 101667879 A 3/2010
CN 108260031 A 7/2018

*Primary Examiner* — Hanh Phan
(74) *Attorney, Agent, or Firm* — Slater Matsil, LLP

(57) ABSTRACT

An apparatus includes a plurality of demultiplexing modules, a plurality of multiplexing modules, and a plurality of N×N switching modules. Each demultiplexing module is connected to P N×N switching modules through optical fibers. Each multiplexing module is connected to P N×N switching modules through optical fibers. Demultiplexing modules and multiplexing modules are connected to same N×N switching modules. At least one N×N switching module connected to a target demultiplexing module has a function of switching optical signals of a plurality of wavelengths for the target demultiplexing module. A quantity of wavelengths of optical signals received by each N×N switching module connected to the target demultiplexing module from the target demultiplexing module is less than a target value, and the target value is a quantity of wavelengths of optical signals received by the target demultiplexing module.

20 Claims, 14 Drawing Sheets

(58) Field of Classification Search
CPC .... H04J 14/02; H04J 14/0201; H04J 14/0202; H04J 14/021; H04J 14/0212; G02B 6/3546; G02B 6/3512
USPC ........ 398/45, 46, 47, 48, 49, 50, 51, 52, 53, 398/54, 55, 56, 57, 79, 83, 82, 85, 87, 33, 398/38, 24, 37, 16, 17, 18; 385/24, 37, 385/16, 17, 18
See application file for complete search history.

(56) References Cited

U.S. PATENT DOCUMENTS

| | | | | |
|---|---|---|---|---|
| 8,116,630 | B2 * | 2/2012 | Wisseman | H04J 14/02122 398/83 |
| 2003/0210870 | A1 | 11/2003 | Graves | |
| 2006/0098981 | A1 * | 5/2006 | Miura | H04J 14/0213 398/45 |
| 2012/0201536 | A1 * | 8/2012 | Liu | H04J 14/0217 398/50 |

* cited by examiner

OPTICAL CROSS-CONNECT APPARATUS AND OPTICAL CROSS-CONNECT DEVICE

CROSS-REFERENCE TO RELATED APPLICATIONS

This application is a continuation of International Application No. PCT/CN2022/132082, filed on Nov. 15, 2022, which claims priority to Chinese Patent Application No. 202111426380.1, filed on Nov. 27, 2021. The disclosures of the aforementioned applications are hereby incorporated by reference in their entireties.

TECHNICAL FIELD

This application relates to the field of optical communication technologies, and in particular, to an optical cross-connect apparatus and an optical cross-connect device.

BACKGROUND

With the development of optical communication technologies, optical switching technologies are widely applied. Optical switching means that an optical cross-connect apparatus directly switches, to an output port without performing any photoelectric conversion, optical signals that are input through an input port.

Currently, when switching optical signals, the optical cross-connect apparatus switches, to a specified output port, optical signals that are of a specified wavelength and that are input through an input port. Consequently, optical switching processing has great limitations.

SUMMARY

This application provides an optical cross-connect apparatus and optical cross-connect device, to reduce limitations of optical switching processing.

According to a first aspect, this application provides an optical cross-connect apparatus. The apparatus includes a plurality of demultiplexing modules, a plurality of multiplexing modules, and a plurality of inter-group switching components. The plurality of demultiplexing modules and the plurality of multiplexing modules are grouped into a plurality of multiplexing/demultiplexing groups. In each multiplexing/demultiplexing group, each demultiplexing module is connected to at least one multiplexing module, and each multiplexing module is connected to at least one demultiplexing module. In two multiplexing/demultiplexing groups included in the plurality of multiplexing/demultiplexing groups, demultiplexing modules in a first multiplexing/demultiplexing group and multiplexing modules in a second multiplexing/demultiplexing group are separately connected to a first inter-group switching component through optical fibers, and multiplexing modules in the first multiplexing/demultiplexing group and demultiplexing modules in the second multiplexing/demultiplexing group are separately connected to a second inter-group switching component through optical fibers. Each inter-group switching component has a function of switching optical signals of a plurality of wavelengths for each connected demultiplexing module.

In the solution described in this application, demultiplexing modules and multiplexing modules are grouped into multiplexing/demultiplexing groups. In each multiplexing/demultiplexing group, each demultiplexing module is connected to at least one multiplexing module, and each multiplexing module is connected to at least one demultiplexing module. Demultiplexing modules and multiplexing modules in two multiplexing/demultiplexing groups are interconnected through inter-group switching components. In this way, through the inter-group switching components or a connection in the multiplexing/demultiplexing group, optical signals that are input through an input port of the demultiplexing module may be switched to output ports of more multiplexing modules. This can reduce limitations of optical signal switching. In addition, each inter-group switching component has the function of switching optical signals of a plurality of wavelengths for each connected demultiplexing module, and there is no need to separately dispose an inter-group switching component for optical signals of each wavelength. Therefore, a quantity of inter-group switching components can also be reduced.

In a possible implementation, each inter-group switching component is merely configured to connect two multiplexing/demultiplexing groups. In this way, there may be a large quantity of demultiplexing modules and multiplexing modules in a multiplexing/demultiplexing group.

In a possible implementation, in any two multiplexing/demultiplexing groups, a demultiplexing module in a first multiplexing/demultiplexing group and a multiplexing module in a second multiplexing/demultiplexing group are separately connected to the first inter-group switching component through optical fibers, and multiplexing modules in the first multiplexing/demultiplexing group and demultiplexing modules in the second multiplexing/demultiplexing group are separately connected to a second inter-group switching component through optical fibers. In this way, for a specific multiplexing/demultiplexing group, optical signals that are output by demultiplexing modules in the multiplexing/demultiplexing group can be switched to any other multiplexing/demultiplexing group for output, so that flexibility of optical switching is improved.

In a possible implementation, in each multiplexing/demultiplexing group, a quantity of demultiplexing modules is the same as a quantity of multiplexing modules. In this way, a quantity of input ports and a quantity of output ports for the inter-group switching component may be the same.

In a possible implementation, in each multiplexing/demultiplexing group, each of all demultiplexing modules is connected to all multiplexing modules through optical fibers. In this way, when optical signal switching is performed, optical signals may be switched from any demultiplexing module to any multiplexing module in the multiplexing/demultiplexing group.

In a possible implementation, the apparatus further includes a plurality of intra-group switching components. Each multiplexing/demultiplexing group corresponds to a different intra-group switching component, and each intra-group switching component has the function of switching optical signals of a plurality of wavelengths for a corresponding demultiplexing module. In each multiplexing/demultiplexing group, each demultiplexing module is connected to a corresponding intra-group switching component through an optical fiber, and each multiplexing module is connected to a corresponding intra-group switching component through an optical fiber.

In the solution described in this application, the optical cross-connect apparatus further includes the plurality of intra-group switching components, and each multiplexing/demultiplexing group corresponds to the different intra-group switching component. When each multiplexing/demultiplexing group corresponds to one intra-group switching component, in each multiplexing/demultiplexing group, a demultiplexing module is connected to any multiplexing module through the intra-group switching component. In this way, the demultiplexing module does not need to be directly connected to each multiplexing module, and one of a quantity of ports of the demultiplexing module and a quantity of ports of the multiplexing module does not increase as the other increases. When each multiplexing/demultiplexing group corresponds to a plurality of intra-group switching components, because the plurality of intra-group switching components are connected to the demultiplexing module and the multiplexing module, when one intra-group switching component is faulty, another intra-group switching component may be used, so that communication interruption caused by a fault can be reduced.

In a possible implementation, each intra-group switching component includes a plurality of intra-group switching modules. For each intra-group switching component, at least one intra-group switching module has the function of switching optical signals of a plurality of wavelengths for each connected demultiplexing module. For each intra-group switching component, a quantity of wavelengths of optical signals received by each intra-group switching module from a connected first demultiplexing module is less than a first value, and the first value is a quantity of wavelengths of optical signals received by the first demultiplexing module. In this way, because the at least one intra-group switching module has the function of switching optical signals of a plurality of wavelengths for each connected demultiplexing module, there is no need to separately dispose an intra-group switching module for optical signals of each wavelength, so that a quantity of intra-group switching modules can be reduced. Further, a quantity of output ports of the demultiplexing module can be reduced, and all intra-group switching modules in each intra-group switching component jointly provide optical switching processing for connected demultiplexing modules.

In a possible implementation, each inter-group switching component includes a plurality of inter-group switching modules. For each inter-group switching component, at least one inter-group switching module has the function of switching optical signals of a plurality of wavelengths for each connected demultiplexing module. For each inter-group switching component, a quantity of wavelengths of optical signals received by each inter-group switching module from a connected second demultiplexing module is less than a second value, and the second value is a quantity of wavelengths of optical signals received by the second demultiplexing module. In this way, because the at least one inter-group switching module has the function of switching optical signals of a plurality of wavelengths for each connected demultiplexing module, there is no need to separately dispose an inter-group switching module for optical signals of each wavelength, so that a quantity of inter-group switching modules can be reduced. Further, a quantity of output ports of the demultiplexing module can be reduced. Each inter-group switching component is responsible for switching optical signals of a part of wavelengths, and all inter-group switching modules in each inter-group switching component jointly provide optical switching processing for a connected demultiplexing module.

In a possible implementation, for each inter-group switching component, wavelengths of optical signals to be switched by each inter-group switching module are different. In this way, all inter-group switching modules jointly provide optical switching processing for a connected demultiplexing module. Alternatively, for each inter-group switching component, there are at least one group of inter-group switching modules, and a part of wavelengths of optical signals to be switched by inter-group switching modules included in each group of inter-group switching modules are the same, but not all the wavelengths are the same. In this way, inter-group switching modules in a single inter-group switching component may switch optical signals of a part of same wavelengths. Therefore, when a specific inter-group switching module cannot switch optical signals of a specific wavelength, another inter-group switching module may be used, so that communication interruption caused by a fault can be reduced.

In a possible implementation, each inter-group switching module is an N×N wavelength selective switch (WSS), and N is an integer greater than 1.

In a possible implementation, the apparatus further includes a control module. The control module is connected to the plurality of demultiplexing modules, the plurality of multiplexing modules, and the plurality of inter-group switching components. The control module is configured to control each demultiplexing module to demultiplex a received optical signal, and configured to control each multiplexing module to multiplex the received optical signal. The control module is further configured to control each inter-group switching component to switch a received optical signal. In this way, the control module may comprehensively control the plurality of demultiplexing modules, the plurality of multiplexing modules, and the plurality of inter-group switching components, so that optical switching is simpler.

According to a second aspect, this application provides an optical cross-connect apparatus. The apparatus includes a plurality of demultiplexing modules, a plurality of multiplexing modules, and a plurality of N×N switching modules, and N is an integer greater than 1. Each demultiplexing module is connected to P N×N switching modules through optical fibers, and P is less than or equal to a quantity of the plurality of N×N switching modules. Each multiplexing module is connected to the P N×N switching modules through optical fibers. N×N switching modules connected to the demultiplexing modules are the same as N×N switching modules connected to the multiplexing modules. At least one N×N switching module connected to a target demultiplexing module has a function of switching optical signals of a plurality of wavelengths for the target demultiplexing module. A quantity of wavelengths of optical signals received by each N×N switching module connected to the target demultiplexing module from the target demultiplexing module is less than a target value. The target value is a quantity of wavelengths of optical signals received by the target demultiplexing module, and the target demultiplexing module belongs to the plurality of demultiplexing modules.

In the solution described in this application, the optical cross-connect apparatus includes the plurality of demultiplexing modules, the plurality of multiplexing modules, and the plurality of N×N switching modules. The demultiplexing modules are connected to the multiplexing modules through the N×N switching modules, so that optical signals received by the demultiplexing modules can be switched to any multiplexing module for output, and optical switching has small limitations. In addition, the demultiplexing modules are not directly connected to the multiplexing modules. Therefore, a quantity of output ports of the demultiplexing module does not increase as a quantity of multiplexing modules increases, and a quantity of input ports of the multiplexing module does not increase as a quantity of demultiplexing modules increases. Furthermore, because the at least one N×N switching module connected to the target demultiplexing module has the function of switching optical signals of a plurality of wavelengths for the target demultiplexing module, there is no need to separately dispose an N×N switching module for optical signals of each wavelength, so that the quantity of N×N switching modules can be reduced, and the quantity of output ports of the demultiplexing module can be reduced.

In a possible implementation, each demultiplexing module is connected to at least one line input port of each N×N switching module through an optical fiber; and each multiplexing module is connected to at least one line output port of each N×N switching module through an optical fiber. In this way, when each demultiplexing module is connected to a plurality of line input ports of each N×N switching module, and each multiplexing module is connected to a plurality of line output ports of each N×N switching module, a small quantity of N×N switching modules are used.

In a possible implementation, each line input port of at least one of the plurality of N×N switching modules is configured to input a plurality of optical signals of different wavelengths, and each line output port is configured to output a plurality of optical signals of different wavelengths. In this way, there is no need to provide an N×N switching module for optical signals of each wavelength, so that a small quantity of N×N switching modules are used.

In a possible implementation, wavelengths of optical signals to be switched by each N×N switching module are different. In this way, all the N×N switching modules jointly provide optical switching processing for connected demultiplexing modules. Alternatively, there are at least one group of N×N switching modules in the plurality of N×N switching modules, and a part of wavelengths of optical signals to be switched by N×N switching modules included in each group of N×N switching modules are the same, but not all the wavelengths are the same. In this way, when a specific N×N switching module cannot switch optical signals of a specific wavelength, another N×N switching module may be used, so that communication interruption caused by a fault can be reduced.

In a possible implementation, each N×N switching module is an N×N WSS.

According to a third aspect, this application provides an optical cross-connect apparatus. The apparatus includes a plurality of demultiplexing modules, a plurality of multiplexing modules, at least one inter-group switching component, and a plurality of intra-group switching components. The plurality of demultiplexing modules and the plurality of multiplexing modules are grouped into a plurality of multiplexing/demultiplexing groups. Each multiplexing/demultiplexing group corresponds to a different intra-group switching component. In each multiplexing/demultiplexing group, each demultiplexing module is connected to a corresponding intra-group switching component through an optical fiber, and each multiplexing module is connected to a corresponding intra-group switching component through an optical fiber. Each intra-group switching component has a function of switching optical signals of a plurality of wavelengths for the corresponding demultiplexing module. The plurality of intra-group switching components are connected through at least one inter-group switching component.

In the solution described in this application, demultiplexing modules and multiplexing modules are grouped into multiplexing/demultiplexing groups. In each multiplexing/demultiplexing group, demultiplexing modules are connected to multiplexing modules through intra-group switching components. An intra-group switching component corresponding to one multiplexing/demultiplexing group and an intra-group switching component corresponding to another multiplexing/demultiplexing group are connected through an inter-group switching component. In this way, optical signals that are input through an input port of the demultiplexing module may be switched to output ports of more multiplexing modules through the intra-group switching component and the inter-group switching component. This can reduce limitations of optical signal switching. In addition, because the demultiplexing module and the multiplexing module are connected merely through the intra-group switching component, a quantity of output ports of the demultiplexing module does not increase as a quantity of multiplexing modules increases, and a quantity of input ports of the multiplexing module does not increase as a quantity of demultiplexing modules increases.

According to a fourth aspect, this application provides an optical cross-connect device. The optical cross-connect device includes an add/drop apparatus and the optical cross-connect apparatus according to the first aspect. The add/drop apparatus is connected to the optical cross-connect apparatus through an optical fiber. In this way, the optical cross-connect device can provide an adding/dropping function, and optical switching has small limitations.

In a possible implementation, the add/drop apparatus includes one demultiplexing module and one multiplexing module. Alternatively, the add/drop apparatus includes a port cross-connect module. Alternatively, the add/drop apparatus includes a first multiplexing module, a first demultiplexing module, a second multiplexing module, and a second demultiplexing module. The first multiplexing module is connected to the first demultiplexing module through an optical fiber, the second multiplexing module is connected to the second demultiplexing module through an optical fiber, the first multiplexing module is connected to the optical cross-connect apparatus through an optical fiber, the second demultiplexing module is connected to the optical cross-connect apparatus through an optical fiber, and the first demultiplexing module and the second multiplexing module are separately configured to connect to user side devices. Alternatively, the add/drop apparatus includes an arrayed waveguide grating (AWG) or a multicast switching optical switch (MCS). In this way, the add/drop apparatus can be implemented in a plurality of manners.

REFERENCE NUMERALS

1. Demultiplexing module; 2. Multiplexing module; 3. Inter-group switching component; 4. Intra-group switching component; 5. Control module;

01. N×N switching module; 02. Port cross-connect module; 03. AWG; 04. MCS;

20. Input port array; 21. First dispersion element; 22. First switching engine; 23. First beam combining element; 24. First lens group; 25. Second dispersion element; 26. Second switching engine; 27. Second beam combining element; 28. Output port array;

31. Inter-group switching module; and 41. Intra-group switching module.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

The following explains and describes some terms and concepts in embodiments of this application.

Figure 1:
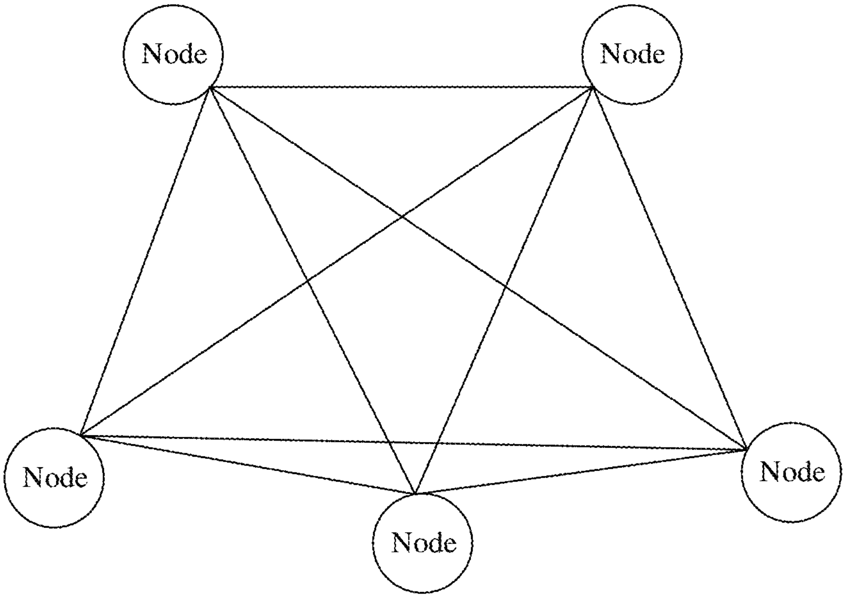
FIG. 1 is a schematic diagram of a mesh architecture according to an example embodiment of this application.

A mesh architecture means that any two of a plurality of nodes are directly interconnected. For example, FIG. 1 is a schematic diagram of a mesh architecture. In FIG. 1, any two of five nodes are interconnected.

Figure 2:
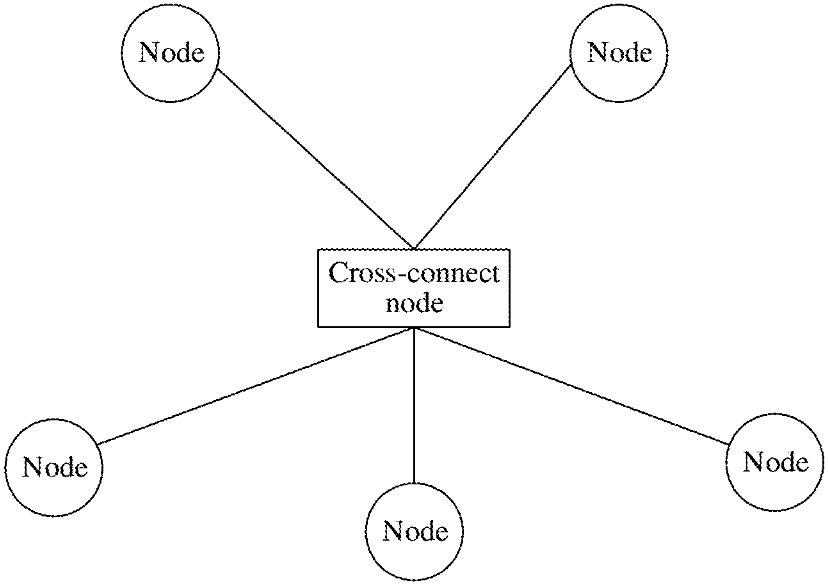
FIG. 2 is a schematic diagram of a switching architecture according to an example embodiment of this application.

A switching architecture means that each of a plurality of nodes is connected to one specific cross-connect node, and any two nodes communicate with each other via the cross-connect node. For example, FIG. 2 is a schematic diagram of a switching architecture. In FIG. 2, five nodes each are connected to a cross-connect node. The switching architecture may also be referred to as a cross-connect architecture.

The following describes a conventional technology.

With the development of communication technologies, optical switching tends to feature higher flexibility, a larger port, and more wavelengths, from the very first implementation of photoelectric conversion and electrical processing, to a wavelength-based fixed switching network (for example, a fixed optical add/drop multiplexer (FOADM)), and to a reconfigurable multiplexing network (for example, a reconfigurable optical add/drop multiplexer (ROADM), and an optical cross-connect (OXC) node). As a switching part of the ROADM or the OXC node, the optical cross-connect apparatus is crucial to flexible switching of optical signals.

Figure 3:
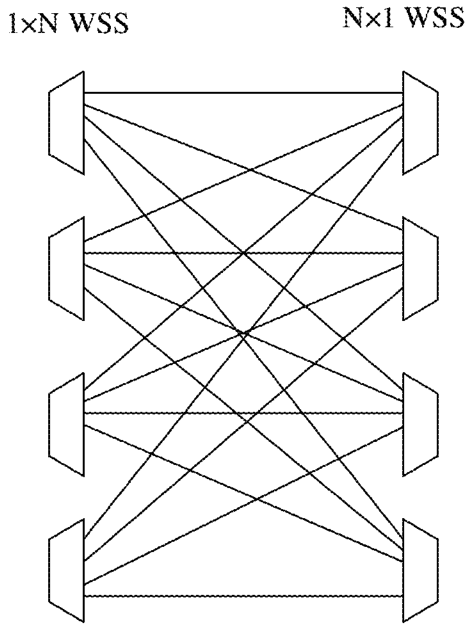
FIG. 3 is a schematic diagram of a structure of a conventional optical cross-connect apparatus according to an example embodiment of this application.

A conventional optical cross-connect apparatus can provide a plurality of input ports, but can provide a limited quantity of input ports. Specifically, FIG. 3 provides a schematic diagram of a structure of a conventional optical cross-connect apparatus. The optical cross-connect apparatus includes a plurality of 1×N WSSs and a plurality of N×1 WSSs (where FIG. 3 shows only four 1×N WSSs and four N×1 WSSs), where each 1×N WSS is used as a demultiplexing module, and each N×1 WSS is used as a multiplexing module. Each 1×N WSS includes one input port and N output ports, and each N×1 WSS includes N input ports and one output port. The input port of the 1×N WSS and the output port of the N×1 WSS each are configured to connect to a line-side optical fiber. A part of the output ports of the 1×N WSS are configured to connect to a part of the input ports of the N×1 WSS, the other part of the output ports of the 1×N WSS are used for dropping, and a part of the input ports of the N×1 WSS are used for adding. Each 1×N WSS is connected to all the N×1 WSSs through optical fibers. Refer to an optical fiber connection manner shown in FIG. 3. In this way, as a quantity of 1×N WSSs and a quantity of N×1 WSSs increase, a value of N also needs to increase. Because the value of N is limited by the development of optical cross-connect chips, currently, the value of N supports only 32. Therefore, a quantity of 1×N WSSs and a quantity of N×1 WSSs in a single optical cross-connect apparatus are limited, and a quantity of input ports of the optical cross-connect apparatus is limited.

The line-side optical fiber may be configured to connect to another device in an optical communication network, for example, another optical cross-connect device.

This application provides an optical cross-connect apparatus. The optical cross-connect apparatus may be used in optical cross-connect devices in a backbone network, a core network, and a metropolitan area network. The optical cross-connect device is, for example, an ROADM or an OXC node. These are merely several examples. A specific application scenario of the optical cross-connect apparatus is not limited in embodiments of this application.

The following describes a specific structure of the optical cross-connect apparatus.

This application provides an optical cross-connect apparatus. The optical cross-connect apparatus includes a plurality of demultiplexing modules 1, a plurality of multiplexing modules 2, and a plurality of N×N switching modules

01. Each demultiplexing module 1 is connected to P N×N switching modules 01 through optical fibers, and P is less than or equal to a quantity of the plurality of N×N switching modules 01. Each multiplexing module 2 is connected to the P N×N switching modules 01 through optical fibers. N×N switching modules 01 connected to the demultiplexing modules 1 are the same as N×N switching modules 01 connected to the multiplexing modules 2. For example, when P is equal to the quantity of the plurality of N×N switching modules 01, each demultiplexing module 1 is connected to each N×N switching module 01 through an optical fiber, and each multiplexing module 2 is connected to each N×N switching module 01 through an optical fiber. For any demultiplexing module 1, a plurality of N×N switching modules 01 are jointly configured to switch optical signals received by the demultiplexing module 1. In this way, the optical signals that are output by the demultiplexing module 1 may arrive at any multiplexing module 2 through the N×N switching module 01.

Any demultiplexing module 1 may be referred to as a target demultiplexing module. In P N×N switching modules 01 connected to the target demultiplexing module, there is at least one N×N switching module 01, and the at least one N×N switching module 01 can switch optical signals of a plurality of wavelengths for the target demultiplexing module. In the P N×N switching modules 01 connected to the target demultiplexing module, a quantity of wavelengths of optical signals received by each N×N switching module 01 from the target demultiplexing module is less than a target value, and the target value is a quantity of wavelengths of optical signals received by the target demultiplexing module. In other words, each N×N switching module 01 connected to the target demultiplexing module cannot provide optical switching processing of optical signals of all wavelengths for the target demultiplexing module. In this way, the P N×N switching modules 01 are jointly configured to switch the optical signals received by the demultiplexing module 1.

For example, the demultiplexing module 1 includes one input port and a plurality of output ports. The input port of the demultiplexing module 1 is configured to connect to a line-side optical fiber, and may be used as an input port of the optical cross-connect apparatus. Each output port of the demultiplexing module 1 is configured to connect to the N×N switching module 01. The multiplexing module 2 includes a plurality of input ports and one output port. Each input port of the multiplexing module 2 is configured to connect to the N×N switching module 01. The output port of the multiplexing module 2 is configured to connect to a line-side optical fiber, and may be used as an output port of the optical cross-connect apparatus. N of the N×N switching module 01 indicates a quantity of input ports or output ports. In other words, N input ports and N output ports are included, and N is an integer greater than 1. The N input ports include one add input port and N−1 line input ports. The N output ports include one drop output port and N−1 line output ports. Each line input port is configured to connect to one output port of the demultiplexing module 1. Each line output port is configured to connect to one input port of the multiplexing module 2. Each line output port cannot output optical signals of a same wavelength from different demultiplexing modules 1, because the optical signals of the same wavelength from the different demultiplexing modules 1 cannot be differentiated when the optical signals are output from one port at the same time. In addition, the add input port and the drop output port of the N×N switching module 01 are further configured to connect to a user side device, and are respectively used for adding and dropping. Adding means that optical signals of one or more wavelengths are transmitted by the user side device to the N×N switching module 01, and output to another node through the N×N switching module 01 and the multiplexing module 2. Dropping means that optical signals of one or more wavelengths are transmitted from the N×N switching module 01 to the user side device.

When the target demultiplexing module is connected to the P N×N switching modules 01, the target demultiplexing module may be connected to at least one line input port of each N×N switching module 01 through an optical fiber. Similarly, when each multiplexing module 2 is connected to the P N×N switching modules 01, the multiplexing module 2 may be connected to at least one line output port of each N×N switching module 01 through an optical fiber.

Specifically, when P is equal to the quantity of the plurality of N×N switching modules 01, for any N×N switching module 01, each demultiplexing module 1 is connected to at least one line input port of the N×N switching module 01 through an optical fiber. Each multiplexing module 2 is connected to at least one line output port of the N×N switching module 01 through an optical fiber.

Figure 4:
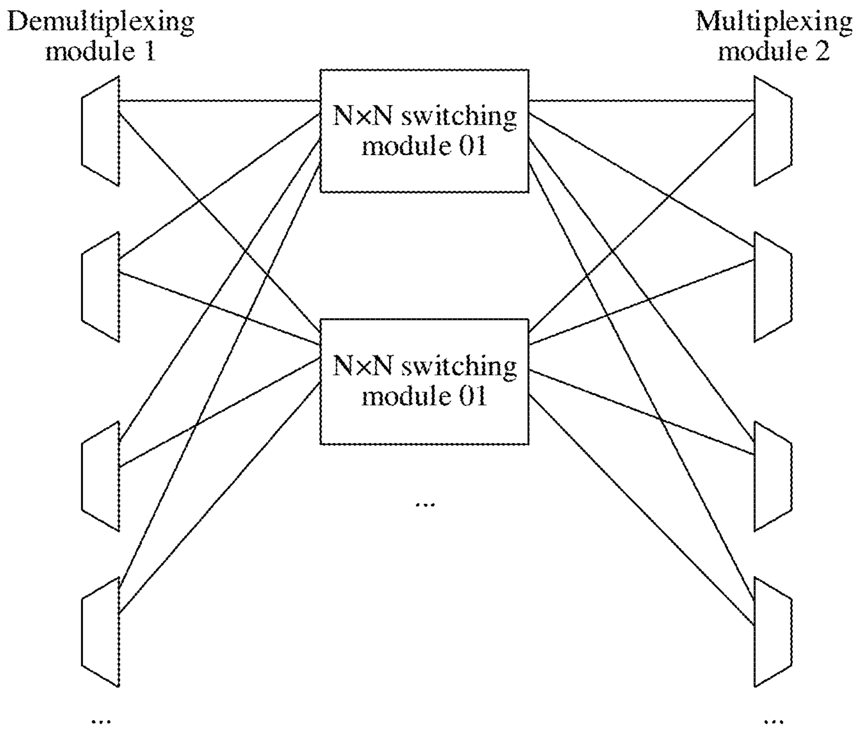
FIG. 4 is a schematic diagram of a structure of an optical cross-connect apparatus according to an example embodiment of this application.

For example, for a single N×N switching module 01, each demultiplexing module 1 is connected to one line input port through an optical fiber. Each multiplexing module 2 is connected to one line output port through an optical fiber. Refer to a schematic diagram of a structure of an optical cross-connect apparatus according to FIG. 4. FIG. 4 shows only four demultiplexing modules 1, four multiplexing modules 2, and two N×N switching modules 01. As shown in FIG. 4, each line input port of each N×N switching module 01 is configured to connect to a different demultiplexing module 1, and each line output port of each N×N switching module 01 is configured to connect to a different multiplexing module 2. In other words, one line input port of the N×N switching module 01 is connected to one output port of one demultiplexing module 1, and one line output port of the N×N switching module 01 is connected to one input port of one multiplexing module 2. In this way, the optical signals that are output by the demultiplexing module 1 may be switched by the N×N switching module 01 to any multiplexing module 2.

For example, when a plurality of N×N switching modules 01 are all connected to the demultiplexing module 1, in the plurality of N×N switching modules 01, each line input port of at least one N×N switching module 01 is configured to input optical signals of a plurality of wavelengths, each line output port is configured to output optical signals of a plurality of wavelengths, and the plurality of wavelengths are different. A quantity of the plurality of wavelengths is less than a quantity of wavelengths of optical signals received by the connected demultiplexing module 1. For one demultiplexing module 1, all N×N switching modules 01 are configured to switch optical signals of all wavelengths that are received by the demultiplexing module 1. For example, an input port of a single demultiplexing module 1 inputs optical signals of 40 wavelengths. The quantity of the plurality of N×N switching modules 01 is 2. Each line input port of one N×N switching module 01 is configured to input optical signals of 39 different wavelengths, and each line input port of the other N×N switching module 01 is configured to input optical signals of one wavelength. For another example, one channel of optical signals received by a single demultiplexing module 1 includes optical signals of 120 wavelengths. Each line input port of each N×N switching module 01 is configured to input optical signals of 20 wavelengths, and each line output port is configured to output optical signals of 20 wavelengths. In this case, optical signal switching of the single demultiplexing module 1 can be implemented by using six N×N switching modules 01.

It should be noted herein that FIG. 4 shows only four demultiplexing modules 1, four multiplexing modules 2, and two N×N switching modules 01. A quantity of demultiplexing modules 1, a quantity of multiplexing modules 2, and the quantity of N×N switching modules 01 are not limited in embodiments of this application.

The apparatus shown in FIG. 4 is used. Each demultiplexing module 1 is connected to each N×N switching module 01 through the optical fiber, and each multiplexing module 2 is connected to each N×N switching module 01 through the optical fiber. When each N×N switching module 01 is configured to switch optical signals of a plurality of wavelengths for each demultiplexing module 1, because each output port of the demultiplexing module 1 is not directly connected to the multiplexing module 2, a quantity of output ports of the demultiplexing module 1 does not increase as the quantity of multiplexing modules 2 increases, and a quantity of input ports of the multiplexing module 2 does not increase as the quantity of demultiplexing modules 1 increases. Therefore, a quantity of optical fiber connections is small. In addition, because each N×N switching module 01 has a function of switching optical signals of a plurality of wavelengths, each line input port of the N×N switching module 01 may input the optical signals of the plurality of wavelengths. In this case, each output port of the demultiplexing module 1 may input the optical signals of the plurality of wavelengths to the N×N switching module 01, and the quantity of output ports of the demultiplexing module 1 is reduced. Similarly, each line output port of the N×N switching module 01 may output optical signals of a plurality of wavelengths, and each line input port of the multiplexing module 2 may also input the optical signals of the plurality of wavelengths. Therefore, the quantity of input ports of the multiplexing module 2 is also reduced. In addition, the at least one N×N switching module 01 supports switching of optical signals of a plurality of wavelengths instead of switching of optical signals of only one wavelength. Therefore, the quantity of N×N switching modules 01 is also reduced.

For example, assuming that the value of N of each N×N switching module 01 is 64, it indicates that 63 demultiplexing modules 1 and 63 multiplexing modules 2 may be connected. When optical signals of 120 wavelengths are input to the input port of the demultiplexing module 1, each N×N switching module 01 supports switching of optical signals of 20 wavelengths of a single demultiplexing module 1, six N×N switching modules 01 need to be used, and a quantity of optical fiber connections is 63×6×2=756. In the conventional optical cross-connect apparatus shown in FIG. 3, 63 demultiplexing modules 1 with 63 output ports and 63 multiplexing modules 2 with 63 input ports need to be used, and a total quantity of optical fiber connections is 63×63=3969. It can be learned that the optical cross-connect apparatus according to this application not only supports flexible switching, but also greatly reduces the quantity of optical fiber connections compared with the quantity of optical fiber connections in the conventional optical cross-connect apparatus.

Figure 5:
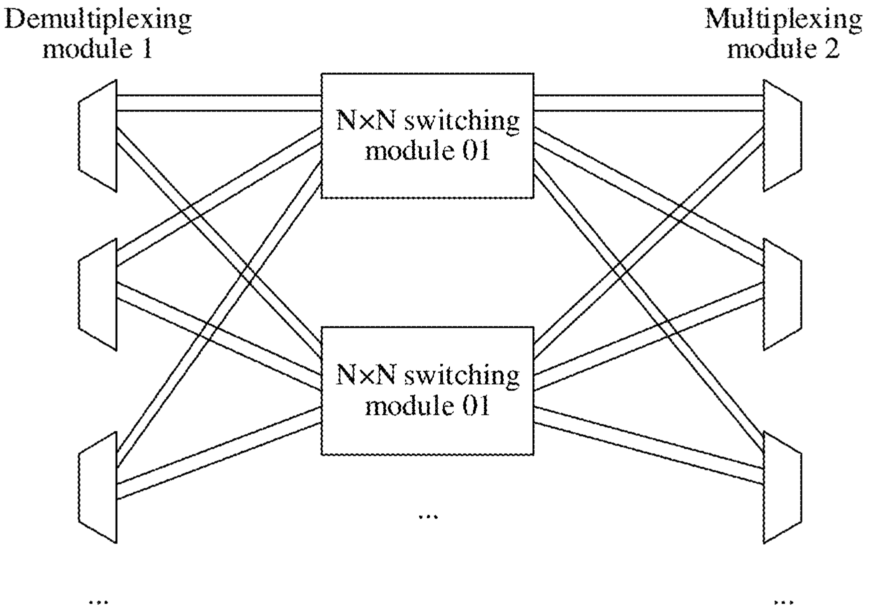
FIG. 5 is a schematic diagram of a structure of an optical cross-connect apparatus according to an example embodiment of this application.

For example, for one N×N switching module 01, each demultiplexing module 1 is connected to a plurality of line input ports through optical fibers. Each multiplexing module 2 is connected to a plurality of line output ports through optical fibers. Refer to a schematic diagram of a structure of an optical cross-connect apparatus according to FIG. 5. FIG. 5 shows only three demultiplexing modules 1, three multiplexing modules 2, and two N×N switching modules 01. As shown in FIG. 5, in each N×N switching module 01, a plurality of line input ports are separately connected to a single demultiplexing module 1. In each N×N switching module 01, a plurality of line output ports are separately connected to a single multiplexing module 2.

In this way, when quantities of demultiplexing modules 1 and multiplexing modules 2 are small, and quantities of line input ports and line output ports of N×N switching modules 01 are large, there may be a plurality of optical fiber connections between the demultiplexing module 1 and each N×N switching module 01, to provide optical switching of more wavelengths for the demultiplexing module 1. For example, optical signals of 120 wavelengths are input to a single demultiplexing module 1. The quantities of demultiplexing modules 1 and multiplexing modules 2 are 4 respectively. Each N×N switching module 01 includes eight line input ports and eight line output ports. Each line input port of each N×N switching module 01 is configured to input optical signals of 20 wavelengths, and each line output port is configured to output optical signals of 20 wavelengths. If the optical cross-connect apparatus shown in FIG. 4 is used, six N×N switching modules 01 need to be used. If the optical cross-connect apparatus shown in FIG. 5 is used, three N×N switching modules 01 need to be used. It can be learned that when there are a plurality of optical fiber connections between the demultiplexing module 1 and each N×N switching module 01, the quantity of N×N switching modules 01 can be reduced.

It should be noted that, in the optical cross-connect apparatuses shown in FIG. 4 and FIG. 5, when the line input port is configured to input optical signals of a plurality of wavelengths, it indicates that the line input port supports input of the optical signals of the plurality of wavelengths, and does not mean that the line input port can merely input the optical signals of the plurality of wavelengths during actual use. During the actual use, the line input port may alternatively input optical signals of one wavelength, and the N×N switching module 01 to which the line input port belongs may alternatively switch the optical signals of the wavelength.

Figure 6:
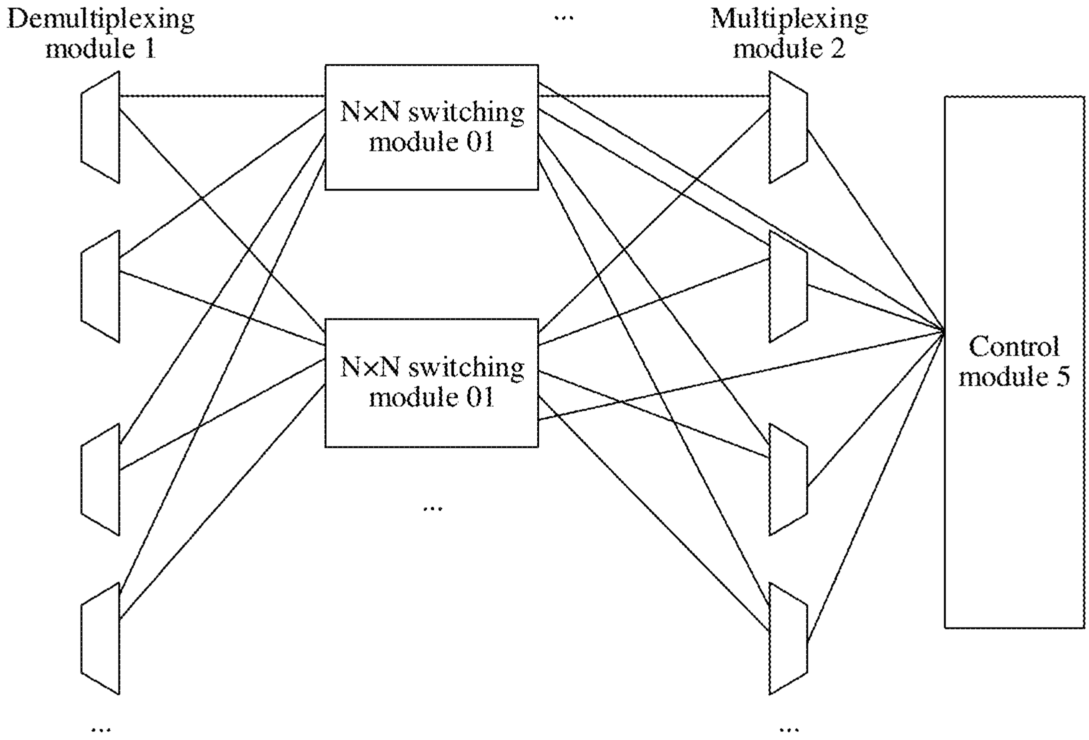
FIG. 6 is a schematic diagram of a structure of an optical cross-connect apparatus according to an example embodiment of this application.

For example, the optical cross-connect apparatus further includes a control module 5. Refer to a schematic diagram of a structure of an optical cross-connect apparatus shown in FIG. 6. The control module 5 is connected to a plurality of demultiplexing modules 1. The control module 5 is connected to a plurality of multiplexing modules 2, and the control module 5 is connected to a plurality of N×N switching modules 01. FIG. 6 does not show that the control module 5 is connected to the plurality of demultiplexing modules 1. The control module 5 is configured to control the demultiplexing module 1 to demultiplex a received optical signal, further configured to control a line output port that corresponds to the received optical signal and that is of each N×N switching module 01, and further configured to control the multiplexing module 2 to multiplex the received optical signal. The control module 5 may communicate with a management apparatus in a network, to receive a control instruction sent by the management apparatus. The control module 5 receives the control instruction, and controls the demultiplexing module 1, the N×N switching module 01, and the multiplexing module 2 based on the control instruction.

For example, for a target demultiplexing module, wavelengths of optical signals that are input through the target demultiplexing module into N×N switching modules 01 are different, and a total quantity of wavelengths of optical signals that are input through the target demultiplexing module to the P N×N switching modules 01 is equal to a quantity of wavelengths of optical signals received by the target demultiplexing module. For example, an input port of the target demultiplexing module inputs optical signals of 120 wavelengths. The target demultiplexing module is connected to six N×N switching modules 01. Each N×N switching module 01 is configured to switch optical signals that are of 20 wavelengths and that are of the target demultiplexing module. A $1^{st}$ N×N switching module switches optical signals of wavelengths 1 to 20. A $2^{nd}$ N×N switching module switches optical signals of wavelengths 21 to 40. By analogy, a $6^{th}$ N×N switching module switches optical signals of wavelengths 101 to 120.

Alternatively, there are at least one group of N×N switching modules in the plurality of N×N switching modules 01, and a part of wavelengths of optical signals to be switched by N×N switching modules 01 in each group of N×N switching modules are the same, but not all the wavelengths are the same. In other words, for a group of N×N switching modules, wavelengths of optical signals that are input through the target demultiplexing module into N×N switching modules 01 overlap, but are not completely the same. The wavelengths of the optical signals that are input through the target demultiplexing module into the N×N switching modules 01 are combined to obtain the wavelengths of the optical signals received by the target demultiplexing module. For example, an input port of the target demultiplexing module inputs optical signals of 80 wavelengths. The target demultiplexing module is connected to seven N×N switching modules 01. Each N×N switching module 01 is configured to switch optical signals that are of 20 wavelengths and that are of the target demultiplexing module. A $1^{st}$ N×N switching module switches optical signals of wavelengths 1 to 20. A $2^{nd}$ N×N switching module switches optical signals of wavelengths 11 to 30. A $3^{rd}$ N×N switching module switches optical signals of wavelengths 21 to 40. By analogy, a $7^{th}$ N×N switching module switches optical signals of wavelengths 61 to 80. In this way, when a specific N×N switching module 01 cannot switch optical signals of some specific wavelengths, another N×N switching module 01 may be used to switch the optical signals of these wavelengths.

For example, when the $1^{st}$ N×N switching module cannot switch the optical signals of the wavelengths 11 to 20, the control module 5 may control the demultiplexing module 1 to input the optical signals of the wavelengths 11 to 20 into the $2^{nd}$ N×N switching module, and the $2^{nd}$ N×N switching module switches the optical signals of the wavelengths 11 to 20.

For example, the plurality of N×N switching modules 01 include one or more spare N×N switching modules. Alternatively, the plurality of N×N switching modules 01 precisely provide optical switching processing for the demultiplexing modules 1. The optical cross-connect apparatus further includes one or more spare N×N switching modules, and each spare N×N switching module is connected to the demultiplexing modules 1 and the multiplexing modules 2 through optical fibers. In this way, when a specific N×N switching module 01 is faulty, a spare N×N switching module may be switched to reduce, as much as possible, optical signal switching failures caused by a fault.

For example, the demultiplexing module 1 is a WSS, an AWG, or an interleaver (ITL), and the multiplexing module 2 is a WSS, an AWG, or an ITL.

Currently, when line input ports and line output ports of the N×N switching module 01 are limited, to connect to more demultiplexing modules 1 and multiplexing modules 2, demultiplexing modules 1 and multiplexing modules 2 are grouped in embodiments of this application, so that more demultiplexing modules 1 and multiplexing modules 2 are included in the optical cross-connect apparatus. The demultiplexing modules 1 and the multiplexing modules 2 are grouped into multiplexing/demultiplexing groups. The multiplexing/demultiplexing groups communicate with each other through a switching architecture. The following describes a structure of the optical cross-connect apparatus when the demultiplexing modules 1 and the multiplexing modules 2 are grouped.

Figure 7:
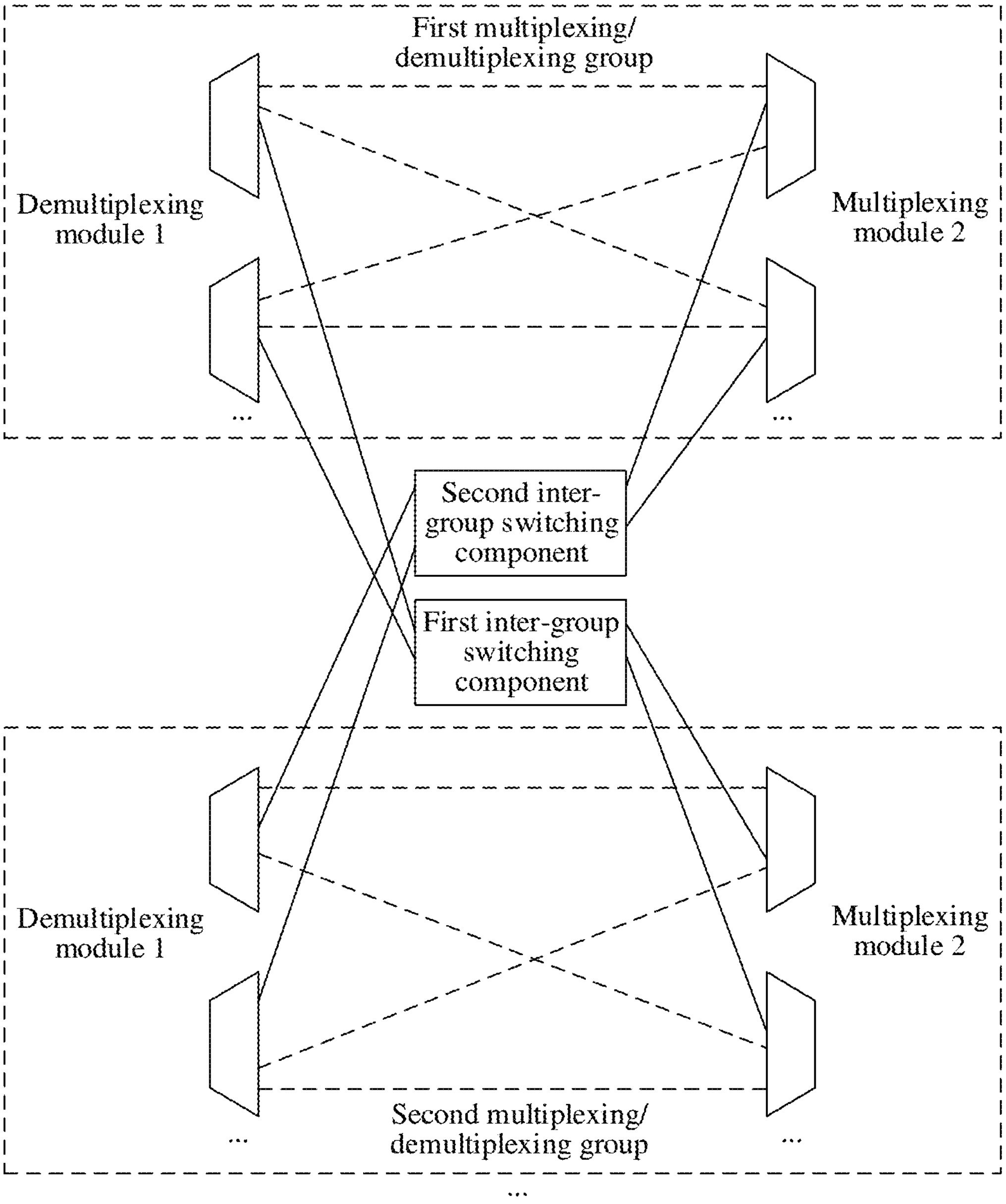
FIG. 7 is a schematic diagram of a structure of an optical cross-connect apparatus according to an example embodiment of this application.

FIG. 7 is a schematic diagram of a structure of an optical cross-connect apparatus. As shown in FIG. 7, the optical cross-connect apparatus includes a plurality of demultiplexing modules 1, a plurality of multiplexing modules 2, and a plurality of inter-group switching components 3. The demultiplexing modules 1 and the multiplexing modules 2 are grouped into a plurality of multiplexing/demultiplexing groups.

In each multiplexing/demultiplexing group, each demultiplexing module 1 is connected to at least one multiplexing module 2, and each multiplexing module 2 is connected to at least one demultiplexing module 1, so that optical signals that are input into the demultiplexing module 1 may be output to the multiplexing module 2. Optionally, in each multiplexing/demultiplexing group, each demultiplexing module 1 is connected to all multiplexing modules 2 in the multiplexing/demultiplexing group through optical fibers, so that optical communication between each demultiplexing module 1 and all the multiplexing modules 2 in the multiplexing/demultiplexing group can be implemented.

In two multiplexing/demultiplexing groups included in the plurality of multiplexing/demultiplexing groups, it is assumed that the two multiplexing/demultiplexing groups include a first multiplexing/demultiplexing group and a second multiplexing/demultiplexing group. Demultiplexing modules 1 in the first multiplexing/demultiplexing group are connected to a first inter-group switching component through optical fibers, and multiplexing modules 2 in the second multiplexing/demultiplexing group are connected to the first inter-group switching component through optical fibers. Multiplexing modules 2 in the first multiplexing/demultiplexing group are connected to a second inter-group switching component through optical fibers, and demultiplexing modules 1 in the second multiplexing/demultiplexing group are connected to the second inter-group switching component through optical fibers. In this way, optical signals of the demultiplexing modules 1 in the first multiplexing/demultiplexing group can be switched to the multiplexing modules 2 in the second multiplexing/demultiplexing group, and optical signals of the demultiplexing modules 1 in the second multiplexing/demultiplexing group can also be switched to the multiplexing modules 2 in the first multiplexing/demultiplexing group. The first inter-group switching component and the second inter-group switching component both belong to the plurality of inter-group switching components 3, but are different.

Each inter-group switching component 3 has a function of switching optical signals of a plurality of wavelengths for a connected demultiplexing module 1, and the plurality of wavelengths are different wavelengths. For example, a specific demultiplexing module 1 receives optical signals of 120 wavelengths, and an inter-group switching component 3 connected to the demultiplexing module 1 switches the optical signals of the 120 wavelengths for the demultiplexing module 1.

In this way, in the optical cross-connect apparatus shown in FIG. 7, the demultiplexing modules 1 and the multiplexing modules 2 in the multiplexing/demultiplexing groups can communicate with each other, and the multiplexing/demultiplexing groups can communicate with each other through the inter-group switching components 3. In addition, the inter-group switching component 3 has the function of switching optical signals of a plurality of wavelengths for each connected demultiplexing module, and there is no need to separately dispose an inter-group switching component 3 for optical signals of each wavelength. Therefore, a quantity of inter-group switching components 3 can also be reduced.

For example, quantities of demultiplexing modules 1 and multiplexing modules 2 in each multiplexing/demultiplexing group are the same, and quantities of demultiplexing modules 1 in different multiplexing/demultiplexing groups may be the same or may be different. There are neither same demultiplexing modules 1 nor same multiplexing modules 2 in any two multiplexing/demultiplexing groups. The quantity of demultiplexing modules 1 in each multiplexing/demultiplexing group is limited by a quantity of demultiplexing modules 1 to which a connected inter-group switching component 3 can be connected. For example, for a specific multiplexing/demultiplexing group, a maximum quantity of demultiplexing modules 1 to which an inter-group switching component 3 connected to the multiplexing/demultiplexing group can be connected is 64, and a quantity of demultiplexing modules 1 in the multiplexing/demultiplexing group is less than or equal to 64.

For example, for any two multiplexing/demultiplexing groups included in the plurality of multiplexing/demultiplexing groups, it is assumed that the two multiplexing/demultiplexing groups include a first multiplexing/demultiplexing group and a second multiplexing/demultiplexing group. Demultiplexing modules 1 in the first multiplexing/demultiplexing group are connected to a first inter-group switching component through optical fibers, and multiplexing modules 2 in the second multiplexing/demultiplexing group are connected to the first inter-group switching component through optical fibers. Multiplexing modules 2 in the first multiplexing/demultiplexing group are connected to a second inter-group switching component through optical fibers, and demultiplexing modules 2 in the second multiplexing/demultiplexing group are connected to the second inter-group switching component through optical fibers. In this way, optical signals of demultiplexing modules 1 in one multiplexing/demultiplexing group can be switched to multiplexing modules 2 in the other multiplexing/demultiplexing group, so that optical switching is more flexible.

Figure 8:
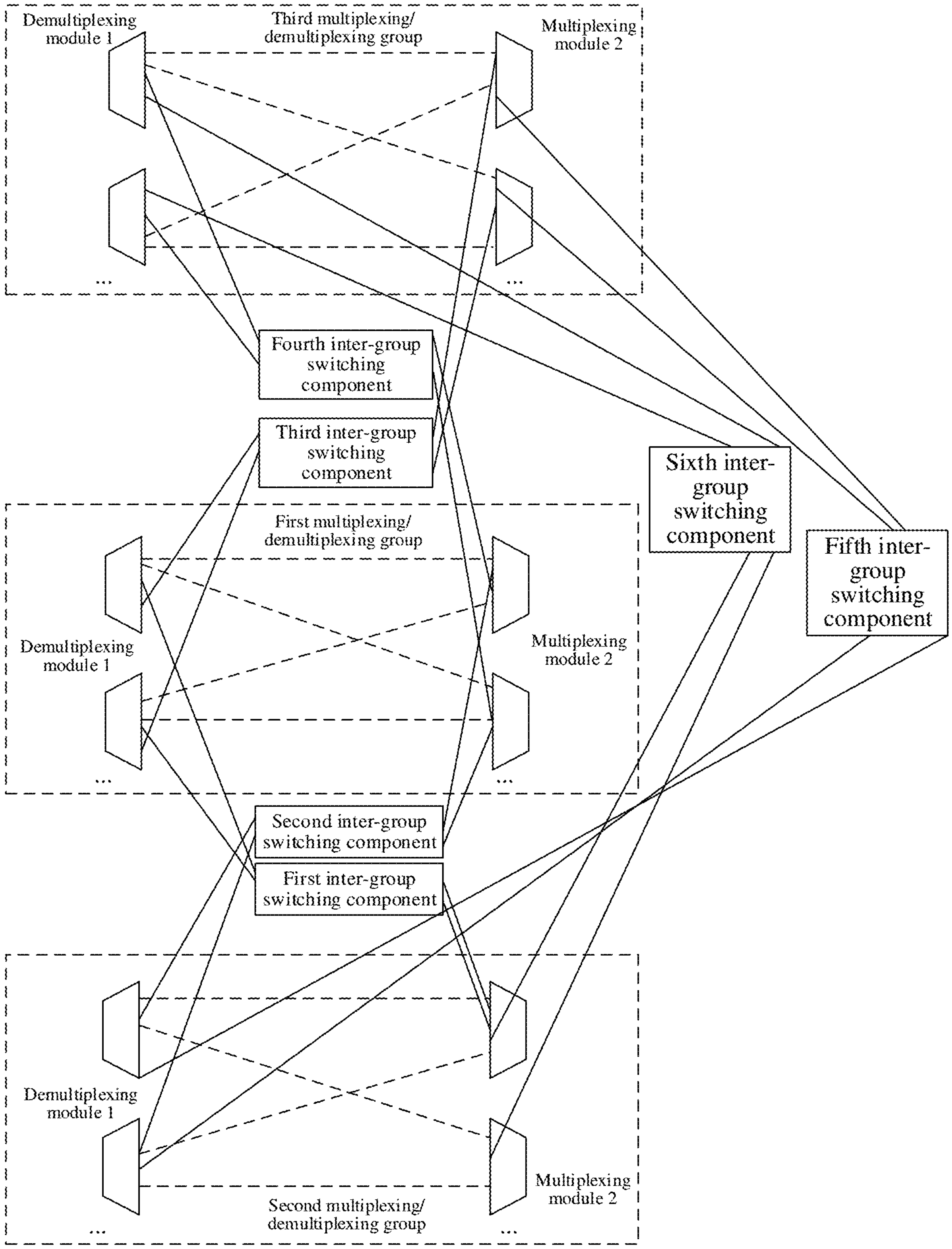
FIG. 8 is a schematic diagram of a structure of an optical cross-connect apparatus according to an example embodiment of this application.

For example, to reduce a quantity of multiplexing/demultiplexing groups as much as possible, each inter-group switching component 3 is merely configured to connect two multiplexing/demultiplexing groups. For example, FIG. 8 is a schematic diagram in which any two of three multiplexing/demultiplexing groups are connected. The three multiplexing/demultiplexing groups include a first multiplexing/demultiplexing group, a second multiplexing/demultiplexing group, and a third multiplexing/demultiplexing group. A first inter-group switching component and a second inter-group switching component are merely configured to connect the first multiplexing/demultiplexing group and the second multiplexing/demultiplexing group, and are not connected to the other multiplexing/demultiplexing group. A third inter-group switching component and a fourth inter-group switching component are merely configured to connect the first multiplexing/demultiplexing group and the third multiplexing/demultiplexing group, and are not connected to the other multiplexing/demultiplexing group. A fifth inter-group switching component and a sixth inter-group switching component are merely configured to connect the second multiplexing/demultiplexing group and the third multiplexing/demultiplexing group, and are not connected to the other multiplexing/demultiplexing group.

In this way, each inter-group switching component 3 can be connected to maximum quantities of demultiplexing modules 1 and multiplexing modules 2. Further, a quantity of multiplexing/demultiplexing groups may be small. For example, if each inter-group switching component 3 can be connected to 64 demultiplexing modules 1, a quantity of demultiplexing modules 1 in each multiplexing/demultiplexing group may be 64.

For example, each inter-group switching component 3 includes a plurality of inter-group switching modules 31. For an inter-group switching component 3 connected to each demultiplexing module 1, each demultiplexing module 1 is connected to each inter-group switching module 31 through an optical fiber. Refer to an optical cross-connect apparatus shown in FIG. 9. For each inter-group switching component 3, at least one inter-group switching module 31 has the function of switching optical signals of a plurality of wavelengths for each demultiplexing module 1. For any inter-group switching component 3, assuming that the inter-group switching component 3 is connected to a second demultiplexing module, each inter-group switching module 31 included in the inter-group switching component 3 is connected to the second demultiplexing module. A quantity of wavelengths of optical signals received by each inter-group switching module 31 from the second demultiplexing module is less than a second value. The second value is a quantity of wavelengths of optical signals received by the second demultiplexing module. In other words, each inter-group switching module 31 is responsible for switching optical signals that are of a part of the wavelengths and that are received by the second demultiplexing module, and all inter-group switching modules 31 in the inter-group switching component 3 are responsible for switching the optical signals that are of all the wavelengths and that are received by the second demultiplexing module. In this way, there is no need to separately dispose an inter-group switching module 31 for optical signals of each wavelength, so that a quantity of inter-group switching modules 31 can be reduced.

Figure 9:
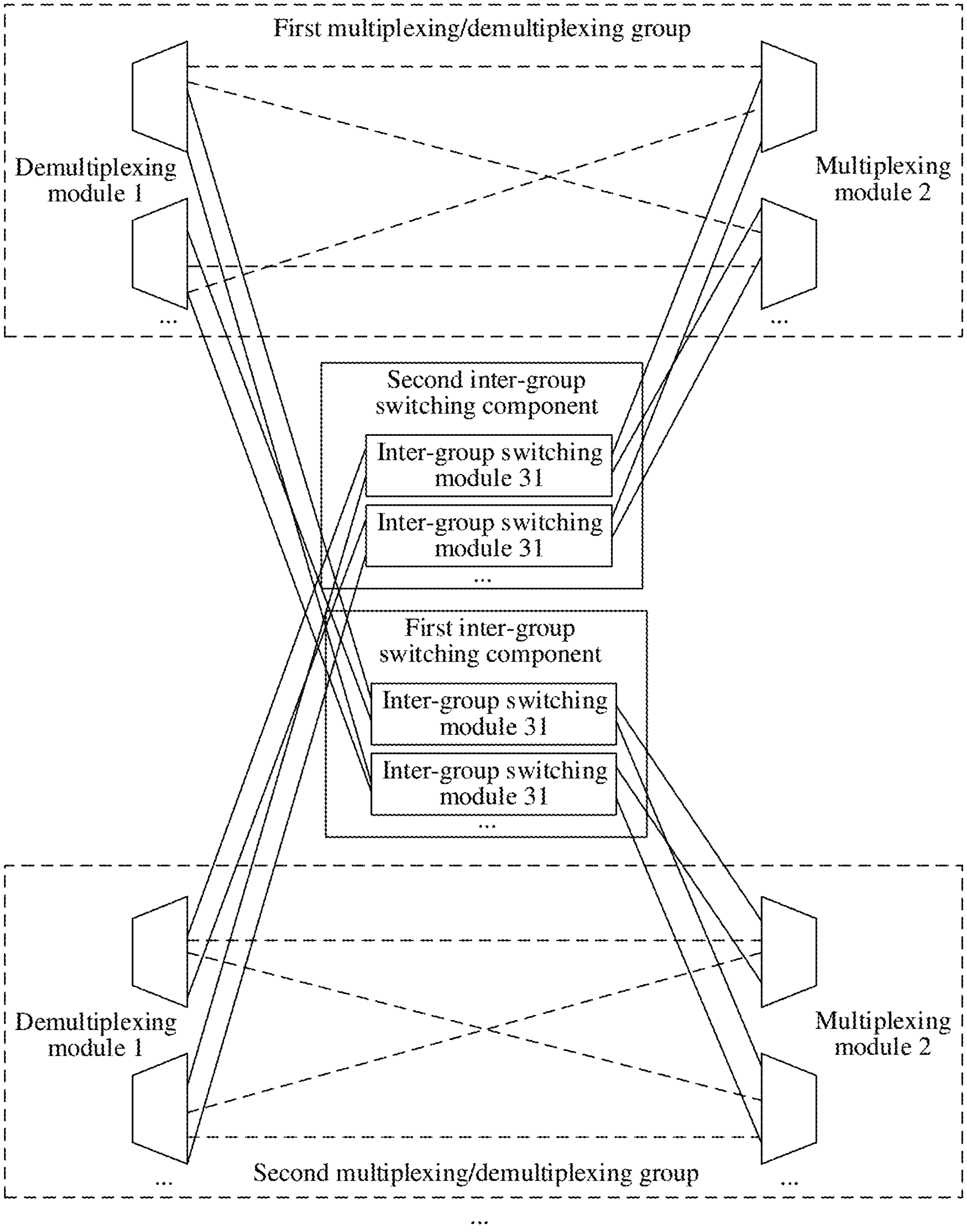
FIG. 9 is a schematic diagram of a structure of an optical cross-connect apparatus according to an example embodiment of this application.

It should be noted that, in the optical cross-connect apparatuses shown in FIG. 7 to FIG. 9, dashed line connections in the multiplexing/demultiplexing groups indicate that there are connections between the demultiplexing modules 1 and the multiplexing modules 2, and optical communication can be performed.

For example, for the inter-group switching component 3 connected to the second demultiplexing module, the wavelengths of the optical signals received by each inter-group switching module 31 from the second demultiplexing module are different. For example, the wavelengths of the optical signals received by the second demultiplexing module are wavelengths 1 to 30. The inter-group switching component 3 connected to the second demultiplexing module includes three inter-group switching modules 31. A $1^{st}$ inter-group switching module receives optical signals of wavelengths 1 to 10. A $2^{nd}$ inter-group switching module receives optical signals of wavelengths 11 to 20. A $3^{rd}$ inter-group switching module receives optical signals of wavelengths 21 to 30.

Alternatively, for the inter-group switching component 3 connected to the second demultiplexing module, there are at least one group of inter-group switching modules, and a part of wavelengths of optical signals to be switched by inter-group switching modules 31 included in each group of inter-group switching modules are the same, but not all the wavelengths are the same. The optical signals are all received from the second demultiplexing module. For example, the wavelengths of the optical signals received by the second demultiplexing module are wavelengths 1 to 30. The inter-group switching component 3 connected to the second demultiplexing module includes four inter-group switching modules 31. A $1^{st}$ inter-group switching module is configured to switch optical signals of wavelengths 1 to 10. A $2^{nd}$ inter-group switching module is configured to switch optical signals of wavelengths 8 to 17. A $3^{rd}$ inter-group switching module is configured to switch optical signals of wavelengths 15 to 24. A $4^{th}$ inter-group switching module is configured to switch optical signals of wavelengths 24 to 30. In this way, when the $1^{st}$ inter-group switching module is faulty, the $2^{nd}$ inter-group switching module may be used to switch the optical signals of wavelengths 8 to 10, to reduce, as much as possible, optical signal switching failures caused by a fault.

For example, each inter-group switching component 3 further includes one or more spare inter-group switching modules, and the spare inter-group switching module is connected to the demultiplexing modules 1 and the multiplexing modules 2 that are connected to the inter-group switching component 3 to which the spare inter-group switching module belongs. After the inter-group switching module 31 in each inter-group switching component 3 is faulty, the demultiplexing modules 1 output the optical signals to the spare inter-group switching module, and the spare inter-group switching module performs switching processing on the optical signals. In this way, after a specific inter-group switching module 31 is faulty, the optical cross-connect apparatus can still perform optical signal switching normally, to reduce, as much as possible, optical signal switching failures caused by a fault.

For example, the optical cross-connect apparatus further includes spare inter-group switching components. When each inter-group switching component 3 is merely configured to connect two multiplexing/demultiplexing groups, two spare inter-group switching components 3 may be connected to every two multiplexing/demultiplexing groups. For a connection manner, refer to a connection manner between the multiplexing/demultiplexing group and the inter-group switching component 3. In this way, after the inter-group switching components 3 connected to every two multiplexing/demultiplexing groups are faulty, the spare inter-group switching components may be used to perform optical signal switching, to reduce, as much as possible, optical signal switching failures caused by a fault.

It should be noted that a structure of the spare inter-group switching component is the same as a structure of the inter-group switching component 3. A structure of the spare inter-group switching module is the same as the structure of the inter-group switching module 31.

For example, in each multiplexing/demultiplexing group, a manner in which each demultiplexing module 1 is connected to each multiplexing module 2 may be an intra-group mesh manner. In other words, in one multiplexing/demultiplexing group, each demultiplexing module 1 is connected to each multiplexing module 2 through an optical fiber. Refer to a schematic diagram of a structure of an optical cross-connect apparatus shown in FIG. 10.

Figure 10:
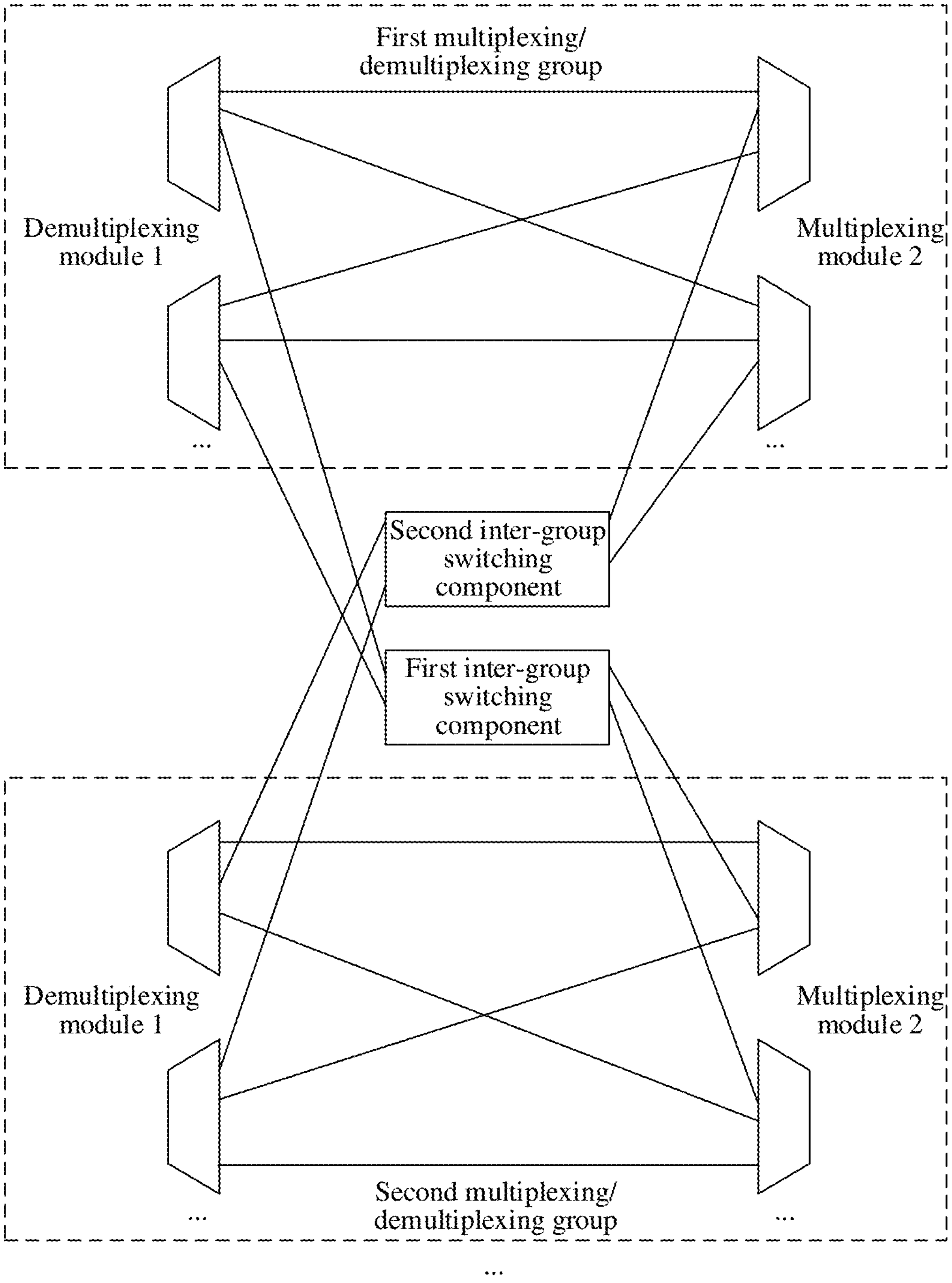
FIG. 10 is a schematic diagram of a structure of an optical cross-connect apparatus according to an example embodiment of this application.

It should be noted that a quantity of ports of each inter-group switching component 3 shown in FIG. 10 may be the same or may be different, provided that the ports can be used for connections of multiplexing/demultiplexing groups.

Figure 11:
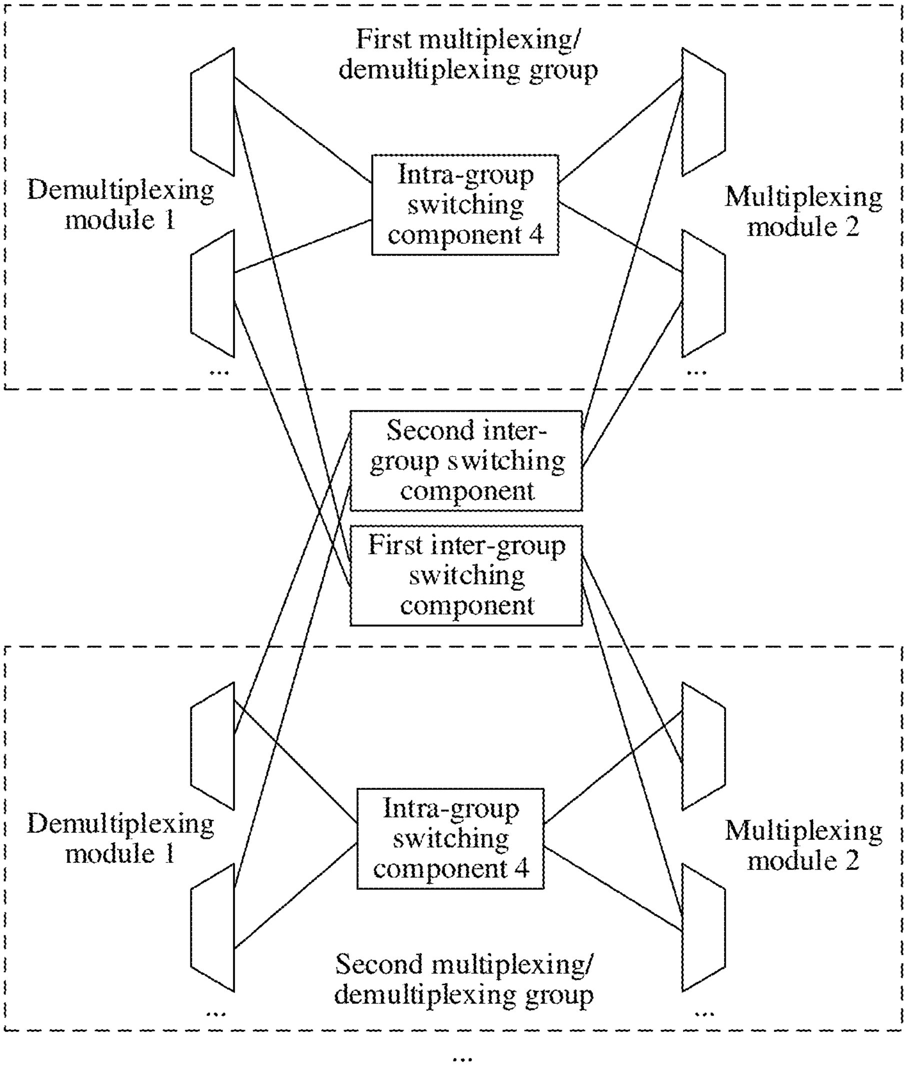
FIG. 11 is a schematic diagram of a structure of an optical cross-connect apparatus according to an example embodiment of this application.

For example, in each multiplexing/demultiplexing group, each demultiplexing module 1 may alternatively be connected to each multiplexing module 2 through a switching component. For example, the optical cross-connect apparatus further includes a plurality of intra-group switching components 4. A structure of the intra-group switching component 4 may be the same as the structure of the inter-group switching component 3, and may also have the function of switching optical signals of a plurality of wavelengths. Each multiplexing/demultiplexing group corresponds to a different intra-group switching component 4. In each multiplexing/demultiplexing group, each demultiplexing module 1 is connected to a corresponding intra-group switching component 4 through an optical fiber, and each multiplexing module 2 is connected to a corresponding intra-group switching component 4 through an optical fiber. Refer to a schematic diagram of a structure of an optical cross-connect apparatus shown in FIG. 11. FIG. 11 shows that each multiplexing/demultiplexing group corresponds to one intra-group switching component 4. In this way, in each multiplexing/demultiplexing group, a demultiplexing module 1 communicates with a multiplexing module 2 through the intra-group switching component 4. A case in which there are plurality of intra-group switching components 4 may be that there is a spare intra-group switching component, used for redundancy protection against a fault, or a single intra-group switching component 4 is inadequate to support switching optical signals of all wavelengths of a single demultiplexing module 1.

It should be noted that a quantity of ports of each inter-group switching component 3 shown in FIG. 7 to FIG. 11 may be the same or may be different, provided that the ports can be used for connections of multiplexing/demultiplexing groups. A quantity of ports of each intra-group switching component 4 shown in FIG. 11 may be the same or may be different, provided that the ports can be used for connections of corresponding multiplexing/demultiplexing groups.

It should be further noted that, the optical cross-connect apparatus shown in FIG. 11 may be understood as a combination of a plurality of optical cross-connect apparatuses shown in FIG. 4. In other words, a plurality of demultiplexing modules 1 and a plurality of multiplexing modules 2 shown in FIG. 4 form one multiplexing/demultiplexing group. A plurality of N×N switching modules 01 shown in FIG. 4 form one intra-group switching component 4 in logic, and every two of the plurality of optical cross-connect apparatuses shown in FIG. 4 are connected through an inter-group switching component 3. Therefore, the optical cross-connect apparatus shown in FIG. 11 is obtained.

It should be further noted that, when the demultiplexing modules 1 and the multiplexing modules 2 in the multiplexing/demultiplexing group are connected through the intra-group switching component 4, if each multiplexing/demultiplexing group corresponds to only one intra-group switching component 4, a quantity of demultiplexing module 1 should be less than or equal to a maximum quantity of demultiplexing modules 1 to which the intra-group switching component 4 can be connected.

Figure 12:
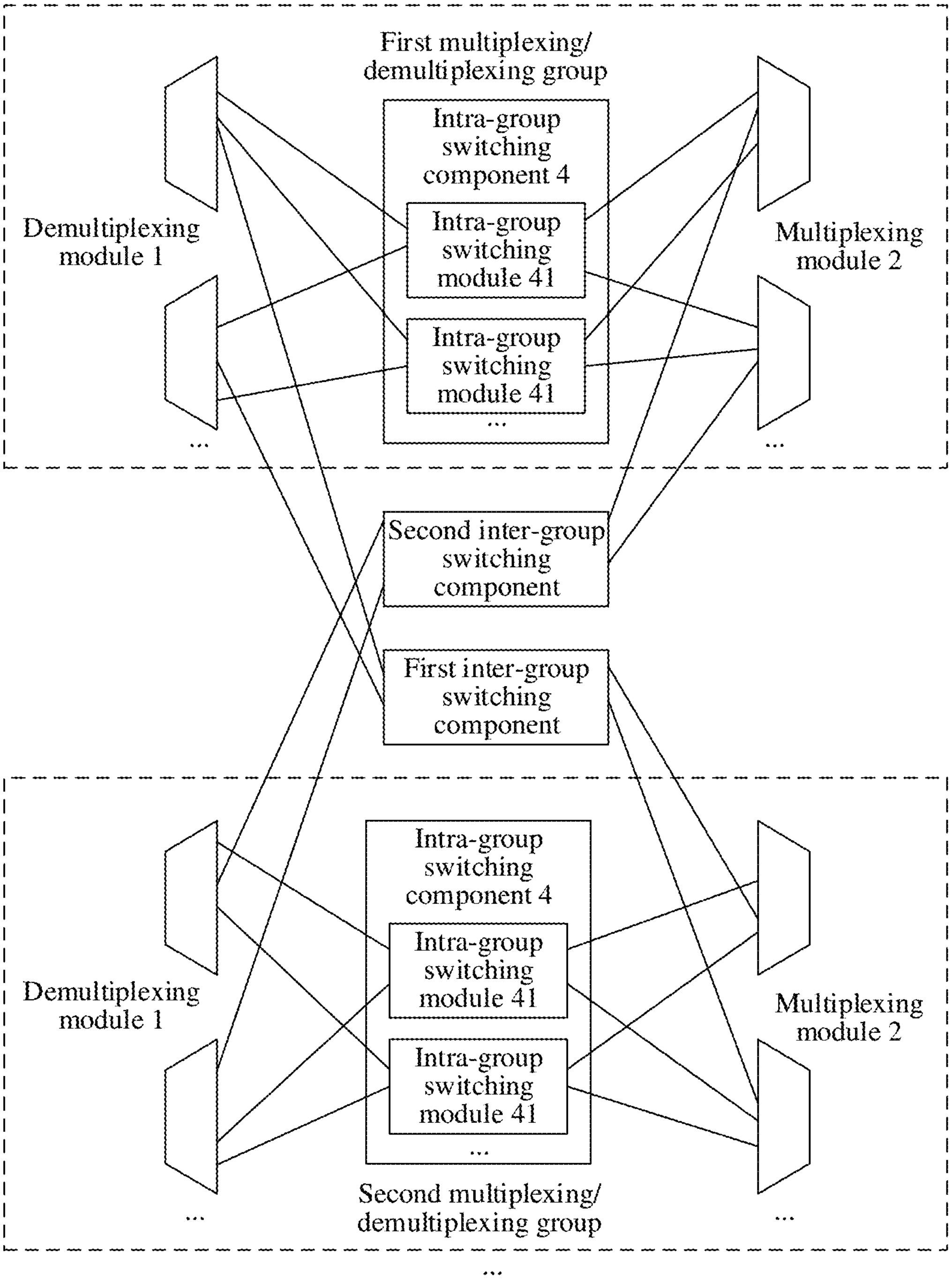
FIG. 12 is a schematic diagram of a structure of an optical cross-connect apparatus according to an example embodiment of this application.

For example, each intra-group switching component 4 includes a plurality of intra-group switching modules 41. In each multiplexing/demultiplexing group, for an intra-group switching component 4 connected to each demultiplexing module 1, each demultiplexing module 1 is connected to each intra-group switching module 41 through an optical fiber, and each multiplexing module 2 is connected to each intra-group switching module 41 through an optical fiber. Refer to an optical cross-connect apparatus shown in FIG. 12.

For each intra-group switching component 4, at least one intra-group switching module 41 has the function of switching optical signals of a plurality of wavelengths for each connected demultiplexing module 1. For any intra-group switching component 4, assuming that the intra-group switching component 4 is connected to a first demultiplexing module, each intra-group switching module 41 included in the intra-group switching component 4 is connected to the first demultiplexing module. A quantity of wavelengths of optical signals received by each intra-group switching module 41 from the first demultiplexing module is less than a first value. The first value is a quantity of wavelengths of optical signals received by the first demultiplexing module. In other words, each intra-group switching module 41 is responsible for switching optical signals that are of a part of the wavelengths and that are received by the first demultiplexing module, and all intra-group switching modules 41 in the intra-group switching component 4 are responsible for switching the optical signals that are of all the wavelengths and that are received by the first demultiplexing module. In this way, there is no need to separately dispose an intra-group switching module 41 for optical signals of each wavelength, so that a quantity of intra-group switching modules 41 can be reduced.

For example, for the intra-group switching component 4 connected to the first demultiplexing module, the wavelengths of the optical signals received by each intra-group switching module 41 from the first demultiplexing module are different.

Alternatively, for the intra-group switching component 4 connected to the first demultiplexing module, there are at least one group of intra-group switching modules, and a part of wavelengths of optical signals to be switched by intra-group switching modules 41 in each group of intra-group switching modules are the same, but not all the wavelengths are the same. The optical signals are all received from the first demultiplexing module. For example, the wavelengths of the optical signals received by the first demultiplexing module are wavelengths 1 to 30. The intra-group switching component 4 connected to the first demultiplexing module includes four intra-group switching modules 41. A $1^{st}$ intra-group switching module is configured to switch optical signals of wavelengths 1 to 10. A $2^{nd}$ intra-group switching module is configured to switch optical signals of wavelengths 8 to 17. A $3^{rd}$ intra-group switching module is configured to switch optical signals of wavelengths 15 to 24. A $4^{th}$ intra-group switching module is configured to switch optical signals of wavelengths 24 to 30. In this way, when the $1^{st}$ intra-group switching module is faulty, the $2^{nd}$ intra-group switching module may be used to switch the optical signals of the wavelengths 8 to 10, to reduce, as much as possible, optical signal switching failures caused by a fault.

For example, each intra-group switching component 4 further includes one or more spare intra-group switching modules, and the spare intra-group switching module is connected to the demultiplexing modules 1 and the multiplexing modules 2 that are connected to the intra-group switching component 4 to which the spare intra-group switching module belongs. After an intra-group switching module 41 in any intra-group switching component 4 is faulty, the demultiplexing modules 1 output the optical signals to the spare intra-group switching module, and the spare intra-group switching module performs switching processing on the optical signals. In this way, after a specific intra-group switching module 41 is faulty, the optical cross-connect apparatus can still perform optical signal switching normally, to reduce, as much as possible, optical signal switching failures caused by a fault.

For example, the optical cross-connect apparatus further includes a plurality of spare intra-group switching components, and each multiplexing/demultiplexing group corresponds to one spare intra-group switching component. For each multiplexing/demultiplexing group, a demultiplexing module 1 in the multiplexing/demultiplexing group is connected to a corresponding spare intra-group switching component, and a multiplexing module 2 is connected to a corresponding spare intra-group switching component. In this way, after an intra-group switching component 4 corresponding to each multiplexing/demultiplexing group is faulty, the spare intra-group switching component may be used to perform optical signal switching, to reduce, as much as possible, optical signal switching failures caused by a fault.

It should be noted that a structure of the spare intra-group switching component is the same as a structure of the intra-group switching component 4. A structure of the spare intra-group switching module is the same as a structure of the intra-group switching module 41.

For example, each inter-group switching module 31 is an N×N WSS, and each intra-group switching module 41 is an N×N WSS.

For example, the optical cross-connect apparatus further includes a control module 5. The control module 5 is connected to a plurality of demultiplexing modules 1. The control module 5 is connected to a plurality of multiplexing modules 2. The control module 5 is connected to a plurality of inter-group switching components 3. The control module 5 is configured to control the demultiplexing module 1 to demultiplex a received optical signal, further configured to control an output port of each inter-group switching component 3 to output the received optical signal, and further configured to control the multiplexing module 2 to multiplex the received optical signal. The control module 5 may communicate with a management apparatus in a network, to receive a control instruction sent by the management apparatus. The control module 5 receives the control instruction, and controls each demultiplexing module 1, each inter-group switching component 3, and each multiplexing module 2 based on the control instruction.

In addition, the control module 5 is further connected to each intra-group switching component 4, and is configured to control an output port of each intra-group switching component 4 to output the received optical signal.

An embodiment of this application further provides a structure of another optical cross-connect apparatus. In a multiplexing/demultiplexing group of the optical cross-connect apparatus, each demultiplexing module 1 is connected to each multiplexing module 2 through an intra-group switching component 4. Optical switching between multiplexing/demultiplexing groups is implemented through optical fiber connections between intra-group switching components 4 and an inter-group switching component 3. Different intra-group switching components 4 are connected to different multiplexing/demultiplexing groups.

The optical cross-connect apparatus includes a plurality of demultiplexing modules 1, a plurality of multiplexing modules 2, at least one inter-group switching component 3, and a plurality of intra-group switching components 4. The plurality of demultiplexing modules 1 and the plurality of multiplexing modules are grouped into a plurality of multiplexing/demultiplexing groups. In each multiplexing/demultiplexing group, quantities of demultiplexing modules 1 and multiplexing modules 2 may be the same or may be different. In different multiplexing/demultiplexing groups, quantities of demultiplexing modules 1 may be the same or may be different, and quantities of multiplexing modules 2 may be the same or may be different.

In each multiplexing/demultiplexing group, each demultiplexing module 1 is connected to a corresponding intra-group switching component 4 through an optical fiber, and each multiplexing module 2 is connected to a corresponding intra-group switching component 4 through an optical fiber.

Between multiplexing/demultiplexing groups, the plurality of intra-group switching components 4 are connected through at least one inter-group switching component 3. When all the intra-group switching components 4 can be connected to one inter-group switching component 3, one inter-group switching component 3 is used. When all the intra-group switching components 4 can be connected to one inter-group switching component 3, a plurality of inter-group switching components 3 are used.

Figure 13:
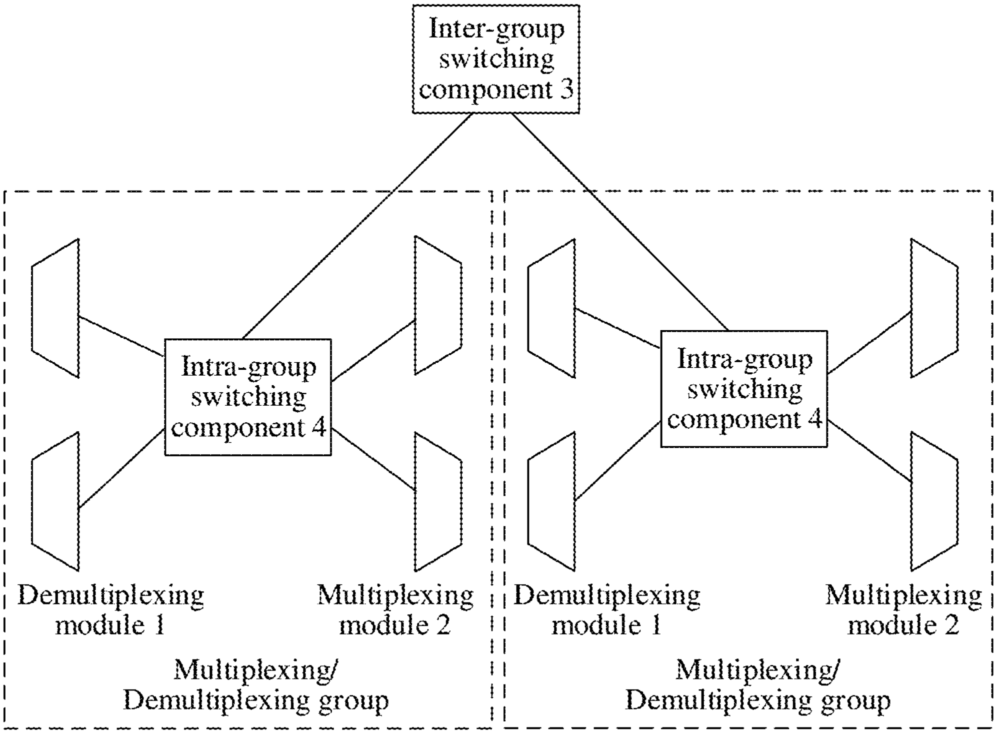
FIG. 13 is a schematic diagram of a structure of an optical cross-connect apparatus according to an example embodiment of this application.

For example, FIG. 13 is a schematic diagram of a structure of an optical cross-connect apparatus. In the optical cross-connect apparatus shown in FIG. 13, two intra-group switching components 4 are connected through one inter-group switching component 3.

Figure 14:
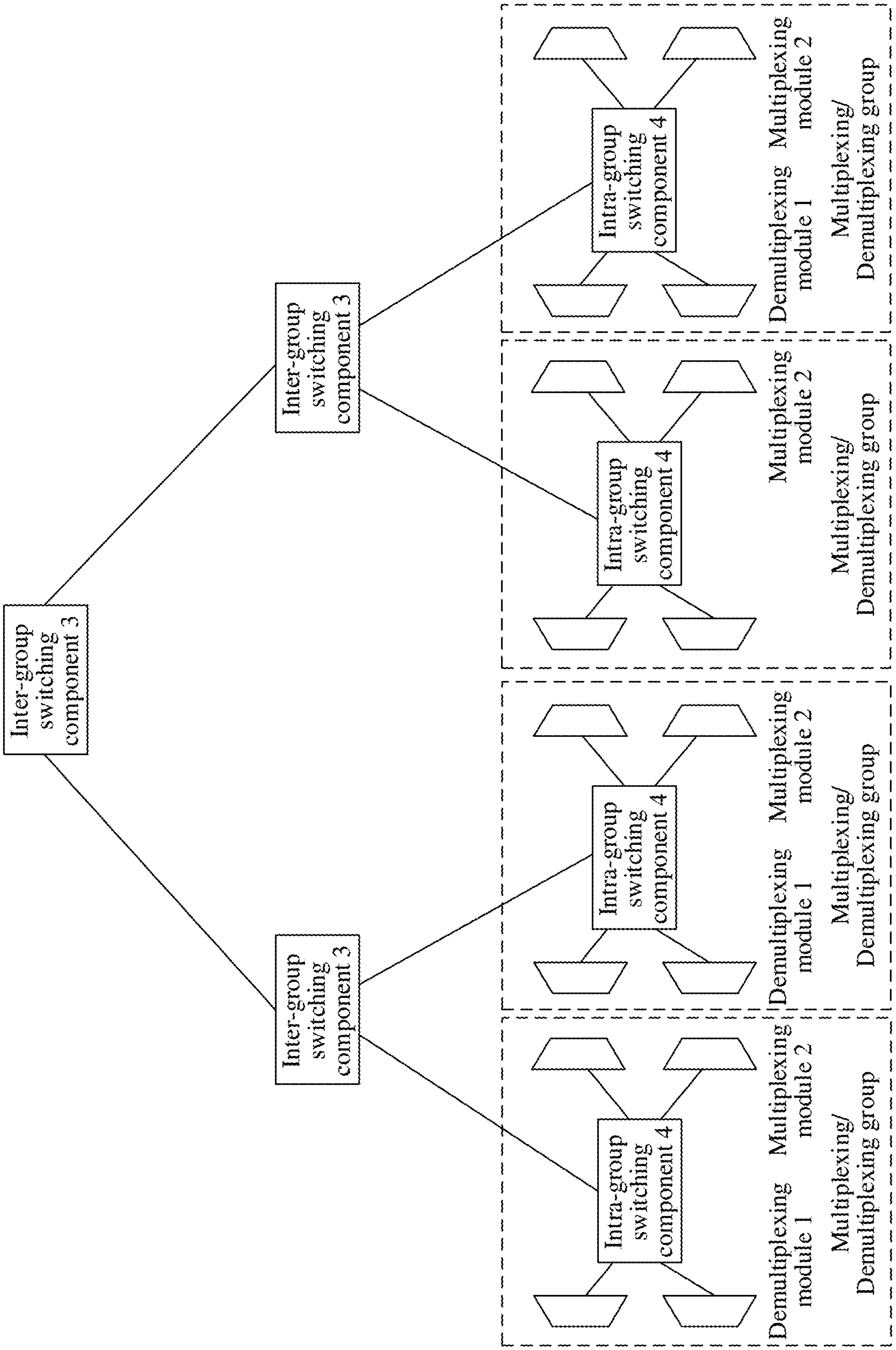
FIG. 14 is a schematic diagram of a structure of an optical cross-connect apparatus according to an example embodiment of this application.

For another example, FIG. 14 is a schematic diagram of a structure of an optical cross-connect apparatus. In the optical cross-connect apparatus shown in FIG. 14, four intra-group switching components 4 are connected through three inter-group switching components 3.

It should be noted that a quantity of ports of each inter-group switching component 3 shown in FIG. 13 and FIG. 14 may be same or may be different, and a quantity of ports of each intra-group switching component 4 may be the same or may be different.

For example, each intra-group switching component 4 has a function of switching optical signals of a plurality of wavelengths for a connected demultiplexing module 1, and there is no need to separately dispose an intra-group switching component 4 for optical signals of each wavelength in a multiplexing/demultiplexing group. Therefore, a quantity of intra-group switching components 4 can be reduced.

For example, when an intra-group switching component 4 is connected to an inter-group switching component 3, two optical fibers may be used for connection, where one optical fiber is used by the intra-group switching component 4 to transmit optical signals to the inter-group switching component 3, and the other optical fiber is used by the inter-group switching component 3 to transmit optical signals to the intra-group switching component 4.

Alternatively, when an intra-group switching component 4 is connected to an inter-group switching component 3, one optical fiber may be used for connection, where the optical fiber is used by the intra-group switching component 4 to transmit optical signals to the inter-group switching component 3, and used by the inter-group switching component 3 to transmit optical signals to the intra-group switching component 4.

Alternatively, when an intra-group switching component 4 is connected to an inter-group switching component 3, the intra-group switching component 4 is divided into an intra-group switching component for dropping and an intra-group switching component for adding, and the inter-group switching component 3 is divided into an inter-group switching component for dropping and an inter-group switching component for adding. The intra-group switching component for dropping is connected to the inter-group switching component for dropping through an optical fiber, and the intra-group switching component for adding is connected to the inter-group switching component for adding through an optical fiber.

For example, similar to the optical cross-connect apparatuses shown in FIG. 7 and FIG. 11, the optical cross-connect apparatuses in FIG. 13 and FIG. 14 may include a spare intra-group switching component. In FIG. 13 and FIG. 14, each intra-group switching component 4 may also include one or more spare intra-group switching modules. The optical cross-connect apparatuses in FIG. 13 and FIG. 14 may include a plurality of spare inter-group switching components, and each inter-group switching component corresponds to one spare switching component. Each inter-group switching component 3 in FIG. 13 and FIG. 14 may also include one or more spare inter-group switching modules. Refer to the foregoing descriptions. Details are not described herein again.

For example, the optical cross-connect apparatus further includes a control module 5. The control module 5 is connected to the demultiplexing modules 1, the demultiplexing modules 1, the inter-group switching component 3, and the intra-group switching components 4, and the control module 5 controls these modules to perform optical switching processing.

It should be noted that, in the optical cross-connect apparatuses shown in FIG. 13 and FIG. 14, for specific structures of the intra-group switching component 4 and the inter-group switching component 3, refer to the foregoing descriptions. Details are not described herein again.

It should be noted that, in this embodiment of this application, for an optical cross-connect apparatus, wavelengths of optical signals that are input from a line-side optical fiber to each demultiplexing module 1 may be the same or may be different, and a quantity of the wavelengths may be the same or may be different.

It should be further noted that, in an intra-group switching component 4 corresponding to each multiplexing/demultiplexing group, each demultiplexing module 1 in the multiplexing/demultiplexing group may use a plurality of output ports to connect to a single intra-group switching module 41. Similarly, each multiplexing module 2 in the multiplexing/demultiplexing group may use a plurality of input ports to connect to a single intra-group switching module 41. In this way, a quantity of intra-group switching modules 41 can be reduced.

An embodiment of this application further provides an optical cross-connect device. The optical cross-connect device includes the optical cross-connect apparatus shown in any one of FIG. 4 to FIG. 14, and an add/drop apparatus. The add/drop apparatus is connected to the optical cross-connect apparatus through an optical fiber, and the add/drop apparatus is connected to the foregoing user side device through an optical fiber. The user side device receives optical signals to be dropped by the optical cross-connect apparatus and sends optical signals to be added to the optical cross-connect apparatus.

Figure 15:
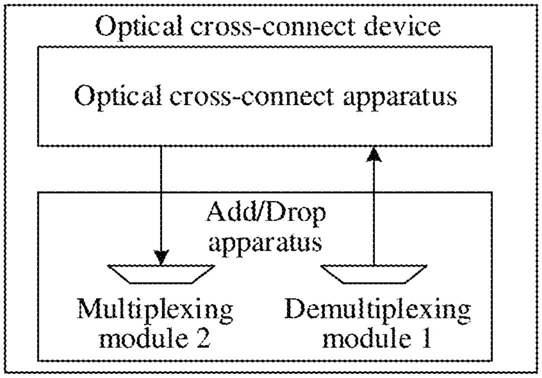
FIG. 15 is a schematic diagram of a structure of an optical cross-connect device according to an example embodiment of this application.

For example, FIG. 15 is a schematic diagram of a structure of an optical cross-connect device. As shown in FIG. 15, the add/drop apparatus includes one demultiplexing module 1 and one multiplexing module 2. The demultiplexing module 1 is connected to the user side device through an optical fiber, and is connected to the optical cross-connect apparatus through an optical fiber. The multiplexing module 2 is connected to the user side device through an optical fiber, and is connected to the optical cross-connect apparatus through an optical fiber. The demultiplexing module 1 is configured to demultiplex one channel of optical signals received from the user side device into a plurality of channels of optical signals, and send the optical signals to the optical cross-connect apparatus. The multiplexing module 2 is configured to combine a plurality of channels of optical signals received from the optical cross-connect apparatus into one channel of optical signals, and send the optical signals to the user side device.

For example, in the optical cross-connect apparatuses shown in FIG. 4 to FIG. 6, the multiplexing module 2 is connected to each N×N switching module 01 through an optical fiber, and the demultiplexing module 1 is connected to each N×N switching module 01 through an optical fiber.

For another example, in the optical cross-connect apparatuses shown in FIG. 7 to FIG. 12, the multiplexing module 2 is connected to each inter-group switching component 3 through an optical fiber, and the demultiplexing module 1 is connected to each inter-group switching component 3 through an optical fiber. When there are intra-group switching components 4, the multiplexing module 2 is connected to each intra-group switching component 4 through an optical fiber, and the demultiplexing module 1 is connected to each intra-group switching component 4 through an optical fiber.

For another example, in the optical cross-connect apparatuses shown in FIG. 13 and FIG. 14, the multiplexing module 2 is connected to each intra-group switching component 4 through an optical fiber, and the demultiplexing module 1 is connected to each intra-group switching component 4 through an optical fiber.

Figure 16:
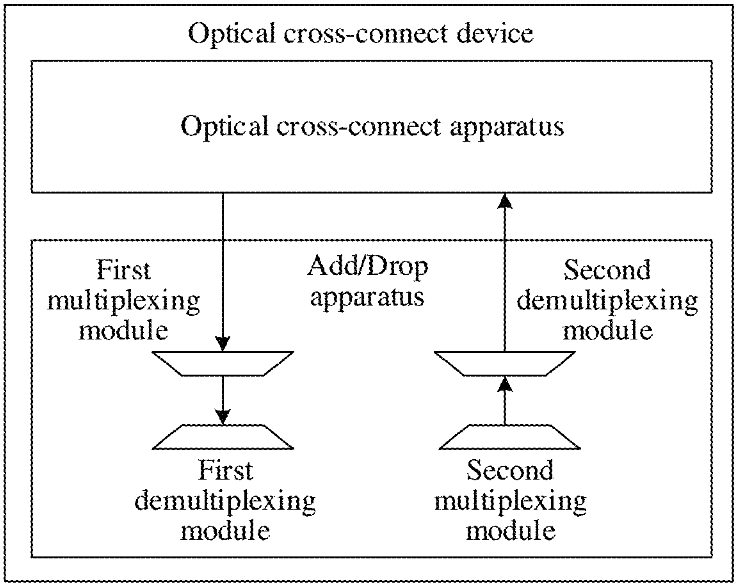
FIG. 16 is a schematic diagram of a structure of an optical cross-connect device according to an example embodiment of this application.

For example, FIG. 16 is a schematic diagram of a structure of another optical cross-connect device. As shown in FIG. 16, the add/drop apparatus includes a first multiplexing module, a first demultiplexing module, a second multiplexing module, and a second demultiplexing module. The first multiplexing module is connected to the first demultiplexing module through an optical fiber, and the second multiplexing module is connected to the second demultiplexing module through an optical fiber. The first multiplexing module is connected to the optical cross-connect apparatus through an optical fiber, and the second demultiplexing module is connected to the optical cross-connect apparatus through an optical fiber. The first demultiplexing module and the second multiplexing module are separately connected to the user side device.

For example, in the optical cross-connect apparatuses shown in FIG. 4 to FIG. 6, the first multiplexing module is connected to each N×N switching module 01 through an optical fiber, and the second demultiplexing module is connected to each N×N switching module 01 through an optical fiber. During dropping, the first multiplexing module combines optical signals received from a plurality of N×N switching modules 01 into one channel of optical signals. The channel of optical signals is transmitted to the first demultiplexing module. The first demultiplexing module demultiplexes the channel of optical signals into a plurality of channels of optical signals, and transmits the optical signals to the user side device. During adding, the second multiplexing module receives a plurality of channels of optical signals from the user side device. The second multiplexing module combines the plurality of channels of optical signals into one channel of optical signals and transmits the channel of optical signals to the second demultiplexing module. The second demultiplexing module demultiplexes the channel of optical signals into a plurality of channels of optical signals, and separately sends the plurality of channels of optical signals to a plurality of N×N switching modules 01. The plurality of N×N switching modules 01 switch the received optical signals to the multiplexing module 2.

For another example, in the optical cross-connect apparatuses shown in FIG. 7 to FIG. 12, the first multiplexing module is connected to each inter-group switching component 3 through an optical fiber, and the second demultiplexing module is connected to each inter-group switching component 3 through an optical fiber. When there are intra-group switching components 4, the first multiplexing module is connected to each intra-group switching component 4 through an optical fiber, and the second demultiplexing module is connected to each intra-group switching component 4 through an optical fiber.

For another example, in the optical cross-connect apparatuses shown in FIG. 13 and FIG. 14, the first multiplexing module is connected to each intra-group switching component 4 through an optical fiber, and the second demultiplexing module is connected to each intra-group switching component 4 through an optical fiber.

Figure 17:
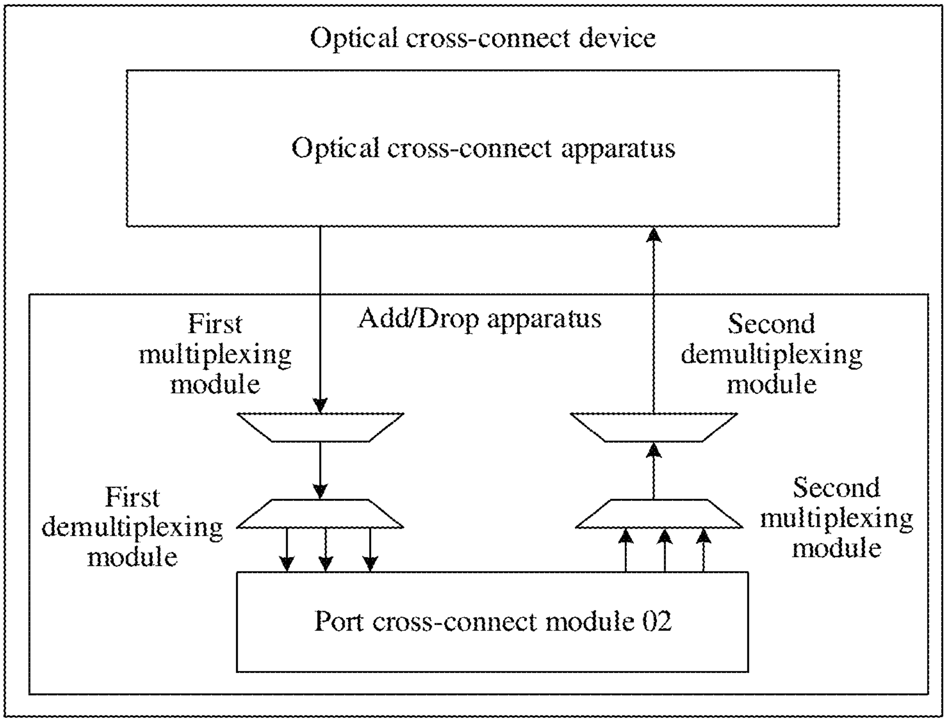
FIG. 17 is a schematic diagram of a structure of an optical cross-connect device according to an example embodiment of this application.

For example, FIG. 17 is a schematic diagram of a structure of another optical cross-connect device. In the optical cross-connect device shown in FIG. 17, a port cross-connect module 02 is added on the basis of FIG. 16. The port cross-connect module 02 is connected to the first demultiplexing module through a plurality of optical fibers, and the port cross-connect module 02 is connected to the second multiplexing module through a plurality of optical fibers. The port cross-connect module 02 is connected to the user side device through a plurality of optical fibers. The port cross-connect module 02 is configured to switch a plurality of optical signals obtained by the first demultiplexing module to any port connected to the user side device, and configured to switch a plurality of optical signals received from the user side device to any port connected to the second multiplexing module.

Figure 18:
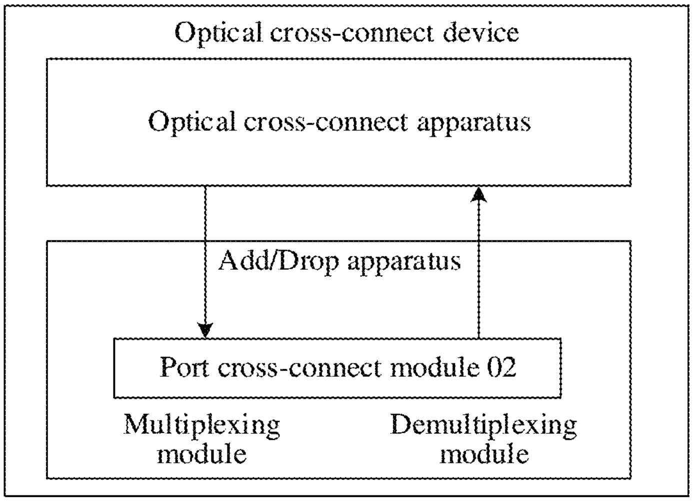
FIG. 18 is a schematic diagram of a structure of an optical cross-connect device according to an example embodiment of this application.

For example, FIG. 18 is a schematic diagram of a structure of another optical cross-connect device. As shown in FIG. 18, the add/drop apparatus includes a port cross-connect module 02. The port cross-connect module 02 includes a plurality of first connection ports and a plurality of second connection ports. Each first connection port is connected to the optical cross-connect apparatus through an optical fiber, and each second connection port is connected to the user side device through an optical fiber. The port cross-connect module 02 can switch optical signals received by the first connection port to any second connection port, and switch optical signals received by the second connection port to any second connection port.

For example, in the optical cross-connect apparatuses shown in FIG. 4 to FIG. 6, each first connection port of the port cross-connect module 02 is connected to each N×N switching module 01 through an optical fiber.

For another example, in the optical cross-connect apparatuses shown in FIG. 7 to FIG. 12, each first connection port of the port cross-connect module 02 is connected to each inter-group switching component 3 through an optical fiber. When there are intra-group switching components 4, each first connection port is connected to each intra-group switching component 4 through an optical fiber.

For another example, in the optical cross-connect apparatuses shown in FIG. 13 and FIG. 14, each first connection port of the port cross-connect module 02 is respectively connected to each intra-group switching component 4 through an optical fiber.

It should be noted that, in the foregoing optical cross-connect devices, a module for optical switching is connected to one first connection port through one optical fiber, or connected to two first connection ports through two optical fibers. When one optical fiber is used for connection, it indicates that the optical fiber can be used for adding and dropping. When two optical fibers are used for connection, one fiber is used for adding, and the other fiber is used for dropping.

Optionally, the port cross-connect module 02 may be implemented by using a planar lightwave circuit (PLC), or may be implemented by using a grating array.

Figure 19:
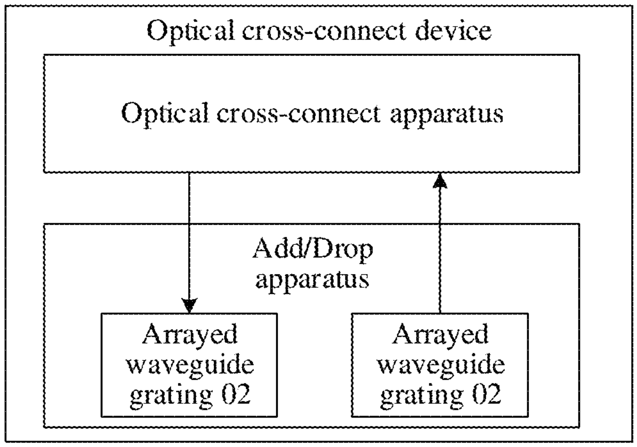
FIG. 19 is a schematic diagram of a structure of an optical cross-connect device according to an example embodiment of this application.

For example, FIG. 19 is a schematic diagram of a structure of another optical cross-connect device. As shown in FIG. 19, an add/drop apparatus includes two AWGs 03 or two MCSs 04. The two AWGs 03 or two MCSs 04 are separately connected to the user side device. The two AWGs 03 are separately connected to the optical cross-connect apparatus through optical fibers, and the two MCSs 04 are separately connected to the optical cross-connect apparatus through optical fibers.

For example, in the optical cross-connect apparatuses shown in FIG. 4 to FIG. 6, the two AWGs 03 are connected to each N×N switching module 01 through optical fibers.

For another example, in the optical cross-connect apparatuses shown in FIG. 7 to FIG. 12, the two AWGs 03 are connected to each inter-group switching component 3 through optical fibers. When there are intra-group switching components 4, the two AWGs 03 are connected to each intra-group switching component 4 through optical fibers.

For another example, in the optical cross-connect apparatuses shown in FIG. 13 and FIG. 14, the two AWGs 03 are connected to each intra-group switching component 4 through optical fibers.

For example, the add/drop apparatus may further include an add/drop wavelength selective switch (ADWSS). The ADWSS is connected to the optical cross-connect apparatus through an optical fiber, and the ADWSS is connected to the user side device through an optical fiber.

It should be noted that the optical cross-connect apparatus is connected to the user side device through the add/drop apparatus. In another implementation, the optical cross-connect apparatus is directly connected to the user side device through an optical fiber. For example, in the optical cross-connect apparatus shown in FIG. 4, each N×N switching module 01 is directly connected to the user side device through an optical fiber.

It should be noted that, a first multiplexing module and a second multiplexing module may both be AWGs, WSSs, or ITLs. A first demultiplexing module and a second demultiplexing module may both be AWGs, WSSs, or ITLs. When the add/drop apparatus is connected to an inter-group switching component 3, the add/drop apparatus may be connected to each inter-group switching module 31 in the inter-group switching component 3. When the add/drop apparatus is connected to an intra-group switching component 4, the add/drop apparatus may be connected to each intra-group switching module 41 in the intra-group switching component 4. Therefore, in FIG. 15, a quantity of output ports of the demultiplexing module 1 is equal to a total quantity of connected switching modules, and a quantity of input ports of the multiplexing module 2 is equal to a total quantity of connected switching modules. In FIG. 16 and FIG. 17, a quantity of output ports of the first demultiplexing module is equal to a total quantity of connected switching modules, and a quantity of input ports of the first multiplexing module is equal to a total quantity of connected switching modules. In correspondence to FIG. 4, the switching modules are N×N switching modules 01. In correspondence to FIG. 7, the switching modules include inter-group switching modules 31 and intra-group switching modules 41.

When there are spare inter-group switching components 3, spare inter-group switching modules 31, spare intra-group switching components 4, spare intra-group switching modules 41, or N×N switching modules 01, the add/drop apparatus is connected to these components or modules through optical fibers.

It should be further noted that, in embodiments of this application, the inter-group switching components 3 and the intra-group switching components 4 may be same switching components, the inter-group switching modules 31 and the intra-group switching modules 41 may also be same switching modules, and the switching modules may all be the foregoing N×N switching modules 01.

The following describes a principle of the N×N switching module 01.

The N×N switching module 01 is an N×N WSS. The N×N WSS includes N input ports and N output ports, and implements output of optical signals of any wavelength from any input port to any output port through internal switching processing.

For example, the N×N WSS may include an input module, an output module, a demultiplexing module, a multiplexing module, and a switching unit. The switching unit may be implemented by a switching engine such as a micro-electro-mechanical system (MEMS) micromirror array or a liquid crystal on silicon (LCOS). Specifically, when optical signals including a plurality of wavelengths enter the N×N WSS from the N input ports spatial optical path adjustment is performed by using the input module, and the adjusted optical signals of different wavelengths are scattered in space by the demultiplexing module, and then enter the switching unit. The switching unit controls, based on route configuration information, the MEMS micromirror array or the LCOS to change transmission directions of the optical paths of the different wavelengths and transmit the optical signals to the plurality of multiplexing modules. After each multiplexing module combines the received optical signals, the output module performs spatial optical path adjustment on the combined optical signals, and the combined optical signals are output by the N output ports.

Figure 20:
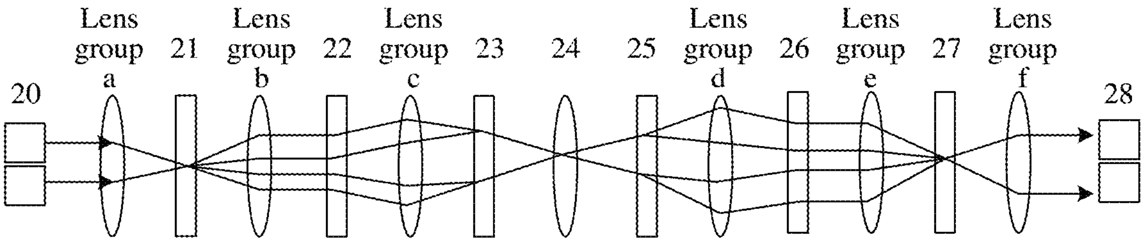
FIG. 20 is a schematic diagram of a structure of an N×N WSS according to an example embodiment of this application.

For another example, FIG. 20 provides a schematic diagram of a structure of an N×N WSS. As shown in FIG. 20, the N×N WSS includes an input port array 20, a first dispersion element 21, a first switching engine 22, a first beam combining element 23, a first lens group 24, a second dispersion element 25, a second switching engine 26, a second beam combining element 27, and an output port array 28. The input port array 20 includes a plurality of input ports, and the output port array 28 includes a plurality of output ports. The input port is configured to obtain a first light beam, where the first light beam is a channel of optical signals. The first dispersion element 21 is configured to receive the first light beam from the input port, and configured to split the first light beam into a plurality of channels of first sub-wavelength light beams. Wavelengths of each channel of first sub-wavelength light beams are different. The first dispersion element 21 is further configured to enable the plurality of channels of first sub-wavelength light beams to be incident to the first switching engine 22. The first switching engine 22 is configured to change a transmission direction of the first sub-wavelength light beam to enable the beam to be incident to a plurality of first beam combining regions included in the first beam combining element 23, where the first beam combining region is used to combine received first sub-wavelength light beams to form a second light beam. The first beam combining element 23 is configured to enable a plurality of channels of second light beams to be incident to the first lens group 24. The first lens group 24 is configured to converge the plurality of channels of second light beams to the second dispersion element 25. The first lens group 24 includes an odd number of lenses. The second dispersion element 25 is configured to split each channel of second light beams into a plurality of channels of second sub-wavelength light beams. Wavelengths of each channel of second sub-wavelength light beams are different. The second dispersion element 25 is configured to enable the plurality of second sub-wavelength light beams to be incident to the second switching engine 26. The second switching engine 26 is configured to change a transmission direction of the second sub-wavelength light beams to enable the beams to be incident to a plurality of second beam combining regions included in the second beam combining element 27. The first switching engine 22 and the second switching engine 26 jointly change the transmission directions of the sub-wavelength light beams along a wavelength plane and a port plane. The wavelength plane and the port plane are perpendicular to each other, and both the wavelength plane and the port plane are parallel to a transmission direction of the first light beam. The second beam combining region is used to combine received second sub-wavelength light beams to form a third light beam, and the second beam combining element 27 is configured to transmit the third light beam to the output port.

It can be learned that the N×N WSS can change, along a port plane XY and along a wavelength plane ZY, a transmission direction of at least one channel of sub-wavelength light beams of the first light beam obtained by the input port, and implement deflection of the sub-wavelength light beam along the port plane XY and along the wavelength plane ZY toward the transmission direction, so that a sub-wavelength light beam obtained by the input port at any position in the input port array can be switched to an output port at any position included in the output port array. Therefore, the sub-wavelength beam is deflected along any direction.

In the WSS shown in FIG. 20, the first switching engine 22 and the second switching engine 26 may be LCOSs or the like. In addition to the foregoing described components, some lens groups are further included, and functions of the lens groups are different. For example, a lens group a is configured to enable light beams input from each input port to be incident to the first dispersion element 21 at different incident angles. A lens group b is configured to enable the plurality of channels of first sub-wavelength light beams to be in parallel with each other on the wavelength plane ZY and the port plane XY, and vertically incident to the first switching engine 22. A lens group c is configured to transmit first sub-wavelength light beams emitted from different first switching regions to different first beam combining regions included in the first beam combining element 23, and converge first sub-wavelength light beams emitted from a same first switching region in a same first beam combining region. A lens group d is configured to converge a plurality of second sub-wavelength light beams on the second switching engine 26. A lens group e is configured to converge a plurality of second sub-wavelength light beams on the second beam combining element 27. A lens group f is configured to converge a plurality of third light beams to the output ports.

It should be noted that the foregoing is merely an example of two N×N switching modules 01. Any switching module that is configured to switch, to any output port, optical signals that are of a plurality of wavelengths and that are input through an input port may be used in embodiments of this application.

In this application, terms such as "first" and "second" are used to distinguish between same items or similar items that have basically same purposes or functions. It should be understood that there is no logical or time sequence dependency between "first" and "second", and a quantity and an execution sequence are not limited. It should further be understood that although the following description uses terms such as "first" and "second" to describe various elements, these elements should not be limited by the terms. These terms are simply used to distinguish one element from another element. For example, a first demultiplexing module may be referred to as a second demultiplexing module without departing from the scope of the various described examples, and similarly, a second demultiplexing module may be referred to as a first demultiplexing module. The first demultiplexing module and the second demultiplexing module may both be demultiplexing modules, and in some specific cases, may be independent and different demultiplexing modules.

In this application, "at least one" means one or more and "a plurality of" means two or more.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. An optical cross-connect apparatus, comprising:

a plurality of demultiplexing modules;

a plurality of multiplexing modules; and a plurality of inter-group multi-wavelength optical switching components;

wherein the plurality of demultiplexing modules and the plurality of multiplexing modules are grouped into a plurality of multiplexing/demultiplexing groups;

wherein, in each multiplexing/demultiplexing group, each demultiplexing module is directly connected to at least one multiplexing module in the same multiplexing/demultiplexing group, and each multiplexing module is directly connected to at least one demultiplexing module in the same multiplexing/demultiplexing group; and wherein, in two multiplexing/demultiplexing groups comprised in the plurality of multiplexing/demultiplexing groups, demultiplexing modules in a first multiplexing/demultiplexing group and multiplexing modules in a second multiplexing/demultiplexing group are separately connected to a first inter-group switching component through optical fibers, and multiplexing modules in the first multiplexing/demultiplexing group and demultiplexing modules in the second multiplexing/demultiplexing group are separately connected to a second inter-group switching component through optical fibers.

2. The apparatus according to claim 1, wherein each inter-group switching component is configured to connect only two multiplexing/demultiplexing groups.

3. The apparatus according to claim 1, wherein, in any two multiplexing/demultiplexing groups, demultiplexing modules in a first multiplexing/demultiplexing group and multiplexing modules in a second multiplexing/demultiplexing group are separately connected to a first inter-group switching component through optical fibers, and multiplexing modules in the first multiplexing/demultiplexing group and demultiplexing modules in the second multiplexing/demultiplexing group are separately connected to a second inter-group switching component through optical fibers.

4. The apparatus according to claim 1, wherein, in each multiplexing/demultiplexing group, a quantity of demultiplexing modules is the same as a quantity of multiplexing modules.

5. The apparatus according to claim 1, wherein, in each multiplexing/demultiplexing group, the demultiplexing modules are connected to the multiplexing modules through optical fibers.

6. The apparatus according to claim 1, wherein the apparatus further comprises a plurality of intra-group multi-wavelength optical switching components;

wherein each multiplexing/demultiplexing group includes a different intra-group switching component; and wherein, in each multiplexing/demultiplexing group, each demultiplexing module is connected to a corresponding intra-group switching component through an optical fiber, and each multiplexing module is connected to a corresponding intra-group switching component through an optical fiber.

7. The apparatus according to claim 6, wherein each intra-group switching component comprises a plurality of intra-group switching modules;

wherein, for each intra-group switching component, at least one intra-group switching module is configured to switch optical signals of a plurality of wavelengths for each connected demultiplexing module; and wherein, for each intra-group switching component, a quantity of wavelengths of optical signals received by each intra-group switching module from a connected first demultiplexing module is less than a quantity of wavelengths of optical signals received by the connected first demultiplexing module.

8. The apparatus according to claim 1, wherein each inter-group switching component comprises a plurality of inter-group switching modules;

wherein, for each inter-group switching component, at least one inter-group switching module is configured to switch optical signals of a plurality of wavelengths for each connected demultiplexing module; and wherein, for each inter-group switching component, a quantity of wavelengths of optical signals received by each inter-group switching module from a connected second demultiplexing module is less than a quantity of wavelengths of optical signals received by the connected second demultiplexing module.

9. The apparatus according to claim 8, wherein, for each inter-group switching component, wavelengths of optical signals to be switched by each inter-group switching module are different.

10. The apparatus according to claim 8, wherein each inter-group switching module is an N×N wavelength selective switch, N being an integer greater than 1.

11. The apparatus according to claim 8, wherein each inter-group switching component includes at least one group of inter-group switching modules, and wherein some but not all of the wavelengths of optical signals to be switched by inter-group switching modules comprised in each group of inter-group switching modules are the same.

12. The apparatus according to claim 1, wherein the apparatus further comprises a control module connected to the plurality of demultiplexing modules, the plurality of multiplexing modules, the first inter-group switching component, and the second inter-group switching component;

wherein the control module is configured to control each demultiplexing module to demultiplex a received optical signal and to control each multiplexing module to multiplex the received optical signal; and wherein the control module is further configured to control each inter-group switching component to switch a received optical signal.

13. An optical cross-connect device, wherein the optical cross-connect device comprises:

the optical cross-connect apparatus according to claim 1; and an add/drop apparatus connected to the optical cross-connect apparatus through an optical fiber.

14. The device according to claim 13, wherein the add/drop apparatus comprises one demultiplexing module and one multiplexing module; or the add/drop apparatus comprises a port cross-connect module; or the add/drop apparatus comprises first and second demultiplexing modules and first and second multiplexing modules, wherein the first demultiplexing module is connected to the optical cross-connect apparatus, the second demultiplexing module is configured to connect to a user side device, the first multiplexing module is connected to the optical cross-connect apparatus, and the second multiplexing module is configured to connect to the user side device; or the add/drop apparatus comprises an arrayed waveguide grating (AWG) or a multicast switching optical switch (MCS).

15. An optical cross-connect apparatus comprising:

a plurality of demultiplexing modules;

a plurality of multiplexing modules; and a plurality of N×N switching modules, N being an integer greater than 1;

wherein each demultiplexing module is connected to P N×N switching modules through optical fibers, P being an integer less than or equal to a quantity of the plurality of N×N switching modules;

wherein each multiplexing module is connected to the P N×N switching modules through optical fibers;

wherein an N×N switching module connected to the demultiplexing module is the same as an N×N switching module connected to the multiplexing module; and wherein at least one N×N switching module connected to a target demultiplexing module has a function of switching optical signals of a plurality of wavelengths for the target demultiplexing module;

wherein the plurality of N×N switching modules includes at least one group of N×N switching modules, and wherein some but not all wavelengths of optical signals to be switched by N×N switching modules comprised in each group of N×N switching modules are the same;

wherein a quantity of wavelengths of optical signals received by each N×N switching module connected to the target demultiplexing module from the target demultiplexing module is less than a target value, the target value being a quantity of wavelengths of optical signals received by the target demultiplexing module; and wherein the target demultiplexing module belongs to the plurality of demultiplexing modules.

16. The apparatus according to claim 15, wherein each demultiplexing module is connected to at least one line input port of each N×N switching module through an optical fiber; and wherein each multiplexing module is connected to at least one line output port of each N×N switching module through an optical fiber.

17. The apparatus according to claim 16, wherein each line input port of at least one of the plurality of N×N switching modules is configured to input a plurality of optical signals of different wavelengths, and wherein each line output port is configured to output a plurality of optical signals of different wavelengths.

18. The apparatus according to claim 15, wherein each N×N switching module is an N×N wavelength selective switch.

19. The apparatus according to claim 15, wherein the apparatus further comprises a control module connected to the plurality of demultiplexing modules, the plurality of multiplexing modules, and the plurality of N×N switching modules.

20. An optical cross-connect apparatus comprising:

a plurality of demultiplexing modules;

a plurality of multiplexing modules;

at least one inter-group switching component; and a plurality of intra-group switching components;

wherein the plurality of demultiplexing modules and the plurality of multiplexing modules are grouped into a plurality of multiplexing/demultiplexing groups;

wherein each multiplexing/demultiplexing group corresponds to a different intra-group switching component;

wherein, in each multiplexing/demultiplexing group, each demultiplexing module is connected to a corresponding intra-group switching component through an optical fiber;

wherein each multiplexing module is connected to a corresponding intra-group switching component through an optical fiber; and wherein the plurality of intra-group switching components are connected through at least one inter-group switching component.

* * * * *